US008165969B2

(12) United States Patent
Shah et al.

(10) Patent No.: US 8,165,969 B2
(45) Date of Patent: Apr. 24, 2012

(54) ROUTE OPTIMIZATION OF SERVICES PROVIDED BY ONE OR MORE SERVICE PROVIDERS FOR COMBINED LINKS

(75) Inventors: Pritam Shah, Brookline, MA (US);
Philip C. Jacobs, Windham, NH (US);
Rahul G. Patel, Nashua, NH (US)

(73) Assignee: Cisco Technology, Inc., San Jose, CA (US)

(*) Notice: Subject to any disclaimer, the term of this patent is extended or adjusted under 35 U.S.C. 154(b) by 1295 days.

(21) Appl. No.: 11/336,584

(22) Filed: Jan. 20, 2006

(65) Prior Publication Data

US 2007/0100776 A1    May 3, 2007

Related U.S. Application Data

(63) Continuation-in-part of application No. 10/631,682, filed on Jul. 31, 2003, now Pat. No. 7,257,560.

(51) Int. Cl.
*G06Q 99/00* (2006.01)
(52) U.S. Cl. ......................................... 705/400; 705/1.1
(58) Field of Classification Search .................. 705/400, 705/1, 1.1
See application file for complete search history.

(56) References Cited

U.S. PATENT DOCUMENTS

| | | | |
|---|---|---|---|
| 5,048,011 A * | 9/1991 | Melen ........................... | 370/422 |
| 5,999,565 A | 12/1999 | Locklear, Jr. et al. | |
| 6,240,462 B1 | 5/2001 | Agraharam et al. | |
| 6,483,870 B1 | 11/2002 | Locklear, Jr. et al. | |
| 6,505,244 B1 | 1/2003 | Natarajan et al. | |
| 6,546,017 B1 | 4/2003 | Khaunte | |
| 6,577,597 B1 | 6/2003 | Natarajan et al. | |
| 6,584,502 B1 | 6/2003 | Natarajan et al. | |
| 6,895,441 B1 * | 5/2005 | Shabtay et al. ............... | 709/238 |
| 2001/0034677 A1 | 10/2001 | Farhat et al. | |
| 2002/0049617 A1 * | 4/2002 | Lencki et al. .................... | 705/4 |

(Continued)

FOREIGN PATENT DOCUMENTS

EP        07 71 6655        8/2009

(Continued)

OTHER PUBLICATIONS

Sklower K., et al., RFC 1717 entitled, The PPP Multilink Protocol (MP), Nov. 1994, 20 pgs.

(Continued)

*Primary Examiner* — Akiba Robinson Boyce
(74) *Attorney, Agent, or Firm* — Cesari and McKenna, LLP

(57) ABSTRACT

A technique performs route optimization of services provided by one or more service providers (SPs) for communication links that are combined in a computer network. According to the novel technique, performance characteristics and statistics ("link data") for two or more combined links are merged to form link data for a single "virtual combined link." Route optimization techniques (e.g., priority-based route optimization) may then be applied to one or more virtual combined links based on the combined link data, in addition to link data for zero or more conventional single links (physical or virtual). Illustratively, a route optimization technique may be used in accordance with the present invention to efficiently and accurately minimize costs associated with services provided by a plurality of SPs, wherein each SP charges for utilization of its service based on a tiered pricing structure. The tiered pricing structure comprises one or more tiers, wherein each tier correlates to an amount of service provided by the SP and an associated cost.

18 Claims, 19 Drawing Sheets

U.S. PATENT DOCUMENTS

| | | | |
|---|---|---|---|
| 2002/0198850 A1 | 12/2002 | Grande et al. | |
| 2004/0120362 A1* | 6/2004 | Chohan et al. | 370/907 |
| 2005/0027548 A1 | 2/2005 | Jacobs et al. | |
| 2009/0034532 A1* | 2/2009 | Hsu et al. | 370/395.1 |

FOREIGN PATENT DOCUMENTS

| | | | |
|---|---|---|---|
| JP | 02/001297178 A | | 10/2001 |
| WO | WO 98/30912 A2 | | 7/1998 |
| WO | WO0079219 A1 | * | 12/2000 |
| WO | WO 03/096162 A2 | | 11/2003 |

OTHER PUBLICATIONS

U.S. Appl. No. 11/336,734, filed Jan. 20, 2006, entitled Link Grouping for Route Optimization, by Pritam Shah.

PCT Notification of Transmittal of the International Search Report and the Written Opinion of the International Searching Authority, or the Declaration, International Application No. PCT/US07/01088, International Filing Date: Jan. 16, 2007, Date of Mailing: Mar. 19, 2008, 9 pages.

Bucholtz; Whos, Whats and Wheres of the Web; Telephony v233n9 pp. 38 Sep. 1, 1997; Dialog File 15; 0149823101-49219; 2 page total.

Orescovic; Shopping for Bandwith; Industry Standar, v4, n5, 1998; Dialog File 9; 02367422.

Notification of Transmittal of the International Search Report and the Written Opinion of the International Searching Authority, or the Declaration, Date of Mailing: Jan. 25, 2007, International Application No. PCT/US04/23328, International Filing Date: Jul. 20, 2004, 12 Pages.

Notification of Transmittal of the International Search Report and the Written Opinion of the International Searching Authority, or the Declaration, Date of Mailing: Jan. 25, 2007, International Application No. PCT/US04/23328, International Filing Date: Jul. 20, 2004, 12 pages.

* cited by examiner

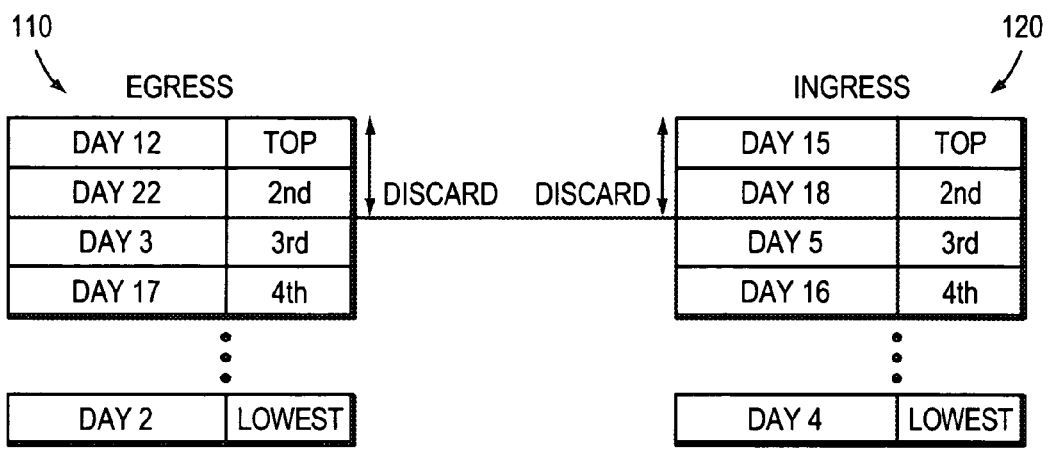
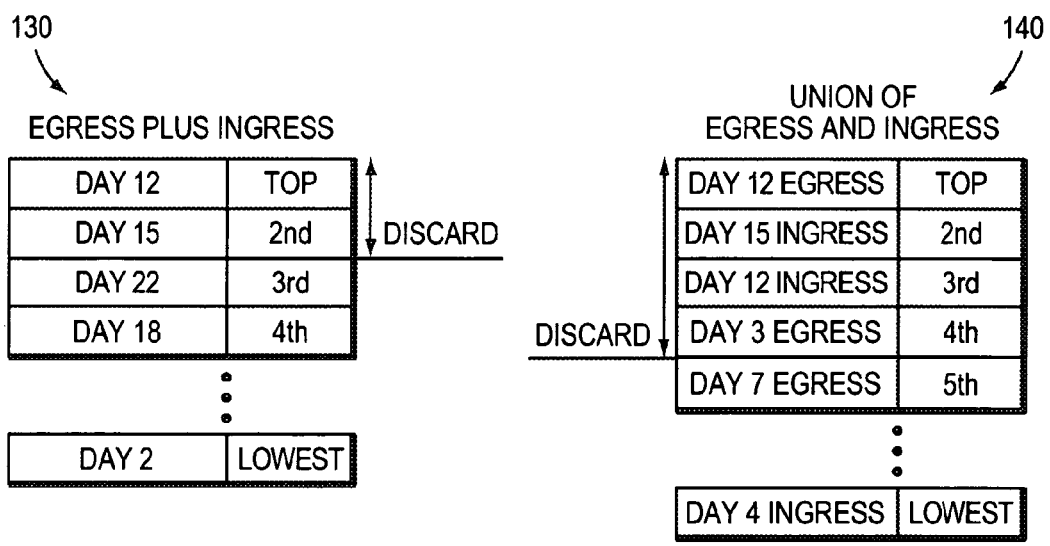
FIG. 1 (PRIOR ART)

ROLLUP PERIOD          DAILY
DAYS IN MONTH           30
T = 30 (NUMBER OF ROLLUP PERIODS IN THE BILLING PERIOD)
N = 2 (NUMBER OF ROLLUP VALUES TO BE DISCOUNTED)
P = 1 (NUMBER OF ROLLUP VALUES GENERATED EACH ROLLUP PERIOD)
"J" IS THE NUMBER OF ROLLUP VALUES YET TO BE COLLECTED IN THE BILLING PERIOD
DISCARD CALCULATION METHOD=SUMMED
ROLLUP PERIODS COVERED BY WALK UP TIERS RULE = N/P + 1 = 3
ROLLUP PERIODS COVERED BY M(N + 1) RULE IS N/P + 2,...T - N/P, WHICH IS 4 TO 28

| ROLLUP PERIOD | MEASURED EGRESS UTILIZATION | MEASURED INGRESS UTILIZATION | MEASURED UTILIZATION SUM | RULE | ORDERED LIST OF N + 1 SUM MAXIMA ||| TARGET TIER |
|---|---|---|---|---|---|---|---|---|
| | | | | | HIGHEST MEASUREMENT SO FAR | Nth HIGHEST MEASUREMENT SO FAR | (N + 1)th HIGHEST MEASUREMENT SO FAR | |
| 1 | 1 | 2 | 3 | WALK UP TIERS | | | | NONE |
| 2 | 3 | 2 | 5 | WALK UP TIERS | | | | NONE |
| 3 | 4 | 2 | 6 | WALK UP TIERS | | | | NONE |
| 4 | 5 | 3 | 8 | M(N + 1) | 6 | 5 | 3 | 3 |
| 5 | 4 | 2 | 6 | M(N + 1) | 8 | 6 | 5 | 5 |
| 6 | 5 | 4 | 9 | M(N + 1) | 8 | 8 | 6 | 6 |
| 7 | 3 | 1 | 4 | M(N + 1) | 9 | 6 | 6 | 6 |
| 8 | 4 | 2 | 6 | M(N + 1) | 9 | 8 | 6 | 6 |
| 9 | 5 | 3 | 8 | M(N + 1) | 9 | 8 | 6 | 6 |
| 10 | 6 | 4 | 10 | M(N + 1) | 10 | 8 | 8 | 8 |
| 11 | 4 | 5 | 9 | M(N + 1) | 10 | 9 | 8 | 8 |
| 12 | 5 | 6 | 11 | M(N + 1) | 11 | 9 | 9 | 9 |
| 13 | 6 | 4 | 10 | M(N + 1) | 10 | 10 | 9 | 9 |

CONTINUE (FROM FIG. 7A)

| # | | | | | | | |
|---|---|---|---|---|---|---|---|
| 14 | 5 | 3 | 8 | 11 | M(N + 1) | 10 | 10 |
| 15 | 4 | 5 | 9 | 11 | M(N + 1) | 10 | 10 |
| 16 | 5 | 4 | 9 | 11 | M(N + 1) | 10 | 10 |
| 17 | 6 | 3 | 9 | 11 | M(N + 1) | 10 | 10 |
| 18 | 5 | 4 | 9 | 11 | M(N + 1) | 10 | 10 |
| 19 | 4 | 5 | 9 | 11 | M(N + 1) | 10 | 10 |
| 20 | 4 | 4 | 8 | 11 | M(N + 1) | 10 | 10 |
| 21 | 5 | 3 | 8 | 11 | M(N + 1) | 10 | 10 |
| 22 | 5 | 4 | 9 | 11 | M(N + 1) | 10 | 10 |
| 23 | 4 | 4 | 8 | 11 | M(N + 1) | 10 | 10 |
| 24 | 3 | 3 | 6 | 11 | M(N + 1) | 10 | 10 |
| 25 | 5 | 5 | 10 | 11 | M(N + 1) | 10 | 10 |
| 26 | 6 | 4 | 10 | 11 | M(N + 1) | 10 | 10 |
| 27 | 5 | 3 | 8 | 11 | M(N + 1) | 10 | 10 |
| 28 | 4 | 4 | 8 | 11 | M(N + 1) | 10 | 10 |
| 29 | 5 | 5 | 10 | IF M((N + 1)−J)=M(N + 1) THEN MAXIMIZE, ELSE M(N + 1) | 11 | 10 | 10 |
| 30 | 6 | 4 | 10 | IF M((N + 1)−J)=M(N + 1) THEN MAXIMIZE, ELSE M(N + 1) | 11 | 10 | 10 |
| | | | | THE "N" MEASUREMENTS THAT GET DISCOUNTED ARE THE SUSTAINED TIER IS | 11 10 | 10 | MAXIMIZE |

FIG. 7B

ROLLUP PERIOD         DAILY
DAYS IN MONTH         30
T = 30 (NUMBER OF ROLLUP PERIODS IN THE BILLING PERIOD)
N = 4 (NUMBER OF ROLLUP VALUES TO BE DISCOUNTED)
P = 2 (NUMBER OF ROLLUP VALUES TAKEN EACH ROLLUP PERIOD)
"J" IS THE NUMBER OF ROLLUP VALUES YET TO BE COLLECTED IN THE BILLING PERIOD
DISCARD CALCULATION METHOD=COMBINED
SUSTAINED TIER IS THE GREATER OF 95% INGRESS OR 95% EGRESS
ROLLUP PERIODS TO BE COVERED BY WALK UP TIERS RULE = N/P + 1 = 3
ROLLUP PERIODS TO BE COVERED BY M(N + 1) RULE IS N/P + 2,...T - N/P, WHICH IS 4 TO 28

| ROLLUP PERIOD | MEASURED EGRESS UTILIZATION | MEASURED INGRESS UTILIZATION | RULE | ORDERED LIST OF N + 1 SUM MAXIMA ||||| EGRESS OR INGRESS TARGET TIER |
|---|---|---|---|---|---|---|---|---|---|
| | | | | HIGHEST MEASURE-MENT SO FAR | 2nd HIGHEST MEASURE-MENT SO FAR | 3rd HIGHEST MEASURE-MENT SO FAR | 4th HIGHEST MEASURE-MENT SO FAR | 5th HIGHEST MEASURE-MENT SO FAR | |
| 1 | 1 | 2 | WALK UP TIERS | | | | | | NONE |
| 2 | 3 | 2 | WALK UP TIERS | | | | | | NONE |
| 3 | 4 | 4 | WALK UP TIERS | | | | | | NONE |
| 4 | 5 | 3 | M(N+1) | 4 | 4 | 3 | 2 | 2 | 2 |
| 5 | 7 | 8 | M(N+1) | 5 | 4 | 4 | 3 | 3 | 3 |
| 6 | 5 | 4 | M(N+1) | 8 | 7 | 5 | 4 | 4 | 4 |
| 7 | 3 | 1 | M(N+1) | 8 | 7 | 5 | 5 | 4 | 4 |
| 8 | 4 | 2 | M(N+1) | 8 | 7 | 5 | 5 | 4 | 4 |
| 9 | 5 | 3 | M(N+1) | 8 | 7 | 5 | 5 | 4 | 4 |

| | | | | | | | | | |
|---|---|---|---|---|---|---|---|---|---|
| 10 | 6 | 4 | M(N+1) | 8 | 7 | 5 | 5 | 5 | 5 |
| 11 | 4 | 5 | M(N+1) | 8 | 7 | 6 | 5 | 5 | 5 |
| 12 | 5 | 6 | M(N+1) | 8 | 7 | 6 | 5 | 5 | 5 |
| 13 | 6 | 4 | M(N+1) | 8 | 7 | 6 | 6 | 5 | 5 |
| 14 | 5 | 3 | M(N+1) | 8 | 7 | 6 | 6 | 6 | 6 |
| 15 | 4 | 5 | M(N+1) | 8 | 7 | 6 | 6 | 6 | 6 |
| 16 | 5 | 4 | M(N+1) | 8 | 7 | 6 | 6 | 6 | 6 |
| 17 | 6 | 3 | M(N+1) | 8 | 7 | 6 | 6 | 6 | 6 |
| 18 | 5 | 4 | M(N+1) | 8 | 7 | 6 | 6 | 6 | 6 |
| 19 | 4 | 5 | M(N+1) | 8 | 7 | 6 | 6 | 6 | 6 |
| 20 | 4 | 4 | M(N+1) | 8 | 7 | 6 | 6 | 6 | 6 |
| 21 | 5 | 3 | M(N+1) | 8 | 7 | 6 | 6 | 6 | 6 |
| 22 | 5 | 4 | M(N+1) | 8 | 7 | 6 | 6 | 6 | 6 |
| 23 | 4 | 4 | M(N+1) | 8 | 7 | 6 | 6 | 6 | 6 |
| 24 | 3 | 3 | M(N+1) | 8 | 7 | 6 | 6 | 6 | 6 |
| 25 | 5 | 5 | M(N+1) | 8 | 7 | 6 | 6 | 6 | 6 |
| 26 | 6 | 4 | M(N+1) | 8 | 7 | 6 | 6 | 6 | 6 |
| 27 | 5 | 3 | M(N+1) | 8 | 7 | 6 | 6 | 6 | 6 |
| 28 | 4 | 4 | M(N+1) | 8 | 7 | 6 | 6 | 6 | 6 |
| 29 | 5 | 5 | IF M((N+1)-J) =M(N+1) THEN MAXIMIZE, ELSE M(N+1) | 8 | 7 | 6 | 6 | 6 | 6 |
| 30 | 6 | 4 | IF M((N+1)-J) =M(N+1) THEN MAXIMIZE, ELSE M(N+1) | 8 | 7 | 6 | 6 | 6 | 6 |
|    |   |   | THE "N" MEASUREMENTS THAT GET DISCOUNTED ARE THE SUSTAINED TIER IS | 8 6 | 7 | 6 | | | MAXIMIZE |

FIG. 8B

ROLLUP PERIOD  DAILY
DAYS IN MONTH  30
T = 30 (NUMBER OF ROLLUP PERIODS IN THE BILLING PERIOD)
N = 2 (NUMBER OF ROLLUP VALUES TO BE DISCOUNTED)
P = 1 (NUMBER OF ROLLUP VALUES TAKEN EACH ROLLUP PERIOD)
"J" IS THE NUMBER OF ROLLUP VALUES YET TO BE COLLECTED IN THE BILLING PERIOD
DISCARD CALCULATION METHOD=SEPARATE
SUSTAINED TIER IS THE GREATER OF 95% INGRESS OR 95% EGRESS
ROLLUP PERIODS COVERED BY WALK UP TIERS RULE = N/P + 1 = 3
ROLLUP PERIODS COVERED BY M(N + 1) RULE IS N/P + 2,...T - N/P, WHICH IS 4 TO 28

| ROLLUP PERIOD | MEASURED EGRESS UTILIZATION | MEASURED INGRESS UTILIZATION | RULE | ORDERED LIST OF N + 1 SUM MAXIMA | | | EGRESS TARGET TIER | HIGHEST AKA M((N+1) -2), INGRESS MEASURE-MENT SO FAR | 2nd HIGHEST AKA M((N+1) -1), INGRESS MEASURE-MENT SO FAR | 3rd HIGHEST AKA M(N+1), INGRESS MEASURE-MENT SO FAR | INGRESS TARGET TIER |
|---|---|---|---|---|---|---|---|---|---|---|---|
| | | | | HIGHEST AKA M((N+1) -2), EGRESS MEASURE-MENT SO FAR | 2nd HIGHEST AKA M((N+1) -1), EGRESS MEASURE-MENT SO FAR | 3rd HIGHEST AKA M(N+1), EGRESS MEASURE-MENT SO FAR | | | | | |
| 1 | 1 | 2 | WALK UP TIERS | | | | NONE | | | | NONE |
| 2 | 3 | 2 | WALK UP TIERS | | | | NONE | | | | NONE |
| 3 | 4 | 4 | WALK UP TIERS | | | | NONE | | | | NONE |
| 4 | 5 | 3 | LARGER OF EGRESS OR INGRESS M(N+1) | 4 | 3 | 1 | 2 | 4 | 2 | 2 | 2 |
| 5 | 7 | 8 | LARGER OF EGRESS OR INGRESS M(N+1) | 5 | 4 | 3 | 3 | 4 | 3 | 2 | 3 |
| 6 | 5 | 4 | LARGER OF EGRESS OR INGRESS M(N+1) | 7 | 5 | 4 | 4 | 8 | 4 | 3 | 4 |
| 7 | 3 | 1 | LARGER OF EGRESS OR INGRESS M(N+1) | 7 | 5 | 5 | 5 | 8 | 4 | 4 | 5 |
| 8 | 4 | 2 | LARGER OF EGRESS OR INGRESS M(N+1) | 7 | 5 | 5 | 5 | 8 | 4 | 4 | 5 |
| 9 | 5 | 3 | LARGER OF EGRESS OR INGRESS M(N+1) | 7 | 5 | 5 | 5 | 8 | 4 | 4 | 5 |
| 10 | 6 | 4 | LARGER OF EGRESS OR INGRESS M(N+1) | 7 | 5 | 5 | 5 | 8 | 4 | 4 | 5 |

| | | | | | | | | | | |
|---|---|---|---|---|---|---|---|---|---|---|
| 11 | 4 | 5 | LARGER OF EGRESS OR INGRESS M(N+1) | 7 | 6 | 5 | 5 | 8 | 4 | 4 | 5 |
| 12 | 5 | 6 | LARGER OF EGRESS OR INGRESS M(N+1) | 7 | 6 | 5 | 5 | 8 | 5 | 4 | 5 |
| 13 | 6 | 4 | LARGER OF EGRESS OR INGRESS M(N+1) | 7 | 6 | 5 | 5 | 8 | 6 | 5 | 5 |
| 14 | 5 | 3 | LARGER OF EGRESS OR INGRESS M(N+1) | 7 | 6 | 6 | 6 | 8 | 6 | 5 | 6 |
| 15 | 4 | 5 | LARGER OF EGRESS OR INGRESS M(N+1) | 7 | 6 | 6 | 6 | 8 | 6 | 5 | 6 |
| 16 | 5 | 4 | LARGER OF EGRESS OR INGRESS M(N+1) | 7 | 6 | 6 | 6 | 8 | 6 | 5 | 6 |
| 17 | 6 | 3 | LARGER OF EGRESS OR INGRESS M(N+1) | 7 | 6 | 6 | 6 | 8 | 6 | 5 | 6 |
| 18 | 5 | 4 | LARGER OF EGRESS OR INGRESS M(N+1) | 7 | 6 | 6 | 6 | 8 | 6 | 5 | 6 |
| 19 | 4 | 5 | LARGER OF EGRESS OR INGRESS M(N+1) | 7 | 6 | 6 | 6 | 8 | 6 | 5 | 6 |
| 20 | 4 | 4 | LARGER OF EGRESS OR INGRESS M(N+1) | 7 | 6 | 6 | 6 | 8 | 6 | 5 | 6 |
| 21 | 5 | 3 | LARGER OF EGRESS OR INGRESS M(N+1) | 7 | 6 | 6 | 6 | 8 | 6 | 5 | 6 |
| 22 | 5 | 4 | LARGER OF EGRESS OR INGRESS M(N+1) | 7 | 6 | 6 | 6 | 8 | 6 | 5 | 6 |
| 23 | 4 | 4 | LARGER OF EGRESS OR INGRESS M(N+1) | 7 | 6 | 6 | 6 | 8 | 6 | 5 | 6 |
| 24 | 3 | 3 | LARGER OF EGRESS OR INGRESS M(N+1) | 7 | 6 | 6 | 6 | 8 | 6 | 5 | 6 |

| | | | CONTINUE (FROM FIG. 9B) | | | | | | | | |
|---|---|---|---|---|---|---|---|---|---|---|---|
| 25 | 5 | 5 | LARGER OF EGRESS OR INGRESS M(N+1) | 7 | 6 | 6 | 6 | 8 | 6 | 5 | 6 |
| 26 | 6 | 4 | LARGER OF EGRESS OR INGRESS M(N+1) | 7 | 6 | 6 | 6 | 8 | 6 | 5 | 6 |
| 27 | 5 | 3 | LARGER OF EGRESS OR INGRESS M(N+1) | 7 | 6 | 6 | 6 | 8 | 6 | 5 | 6 |
| 28 | 4 | 4 | LARGER OF EGRESS OR INGRESS M(N+1) | 7 | 6 | 6 | 6 | 8 | 6 | 5 | 6 |
| 29 | 5 | 28 | IF M(N+1-J) = M(N+1) THEN MAXIMIZE. IF M(N+1-J) > OTHER M(N+1) THEN LARGER OF EGRESS M(N+1) AND INGRESS M(N+1), ELSE MAXIMIZE | 7 | 6 | 6 | 6 | 8 | 6 | 5 | 6 |
| 30 | 6 | 27 | IF M(N+1-J) = M(N+1) THEN MAXIMIZE. IF M(N+1-J) > OTHER M(N+1) THEN LARGER OF EGRESS M(N+1) AND INGRESS M(N+1), ELSE MAXIMIZE | | 6 | | MAXIMIZE | 28 | 8 | 6 | 6 |
| | | | CANDIDATE SUSTAINED TIERS ARE THE SUSTAINED TIER IS | 8 | | | | | | | 8 |

ROUTE OPTIMIZATION OF SERVICES PROVIDED BY ONE OR MORE SERVICE PROVIDERS FOR COMBINED LINKS

CROSS-REFERENCE TO RELATED APPLICATIONS

The present application is a continuation-in-part of commonly assigned copending U.S. patent application Ser. No. 10/631,682, entitled COST MINIMIZATION OF SERVICES PROVIDED BY MULTIPLE SERVICE PROVIDERS, filed by Jacobs et al. on Jul. 31, 2003, now U.S. Pat. No. 7,257,560 now published as U.S. patent application Ser. No. 2005/0027548 on Feb. 3, 2005, the contents of which are hereby incorporated in its entirety.

This application is also related to commonly-owned copending U.S. patent application serial No. 11/336,734, entitled LINK GROUPING FOR ROUTE OPTIMIZATION, filed by Shah on Jan. 20, 2006, the contents of which are hereby incorporated in its entirety.

BACKGROUND OF THE INVENTION

1. Field of the Invention

The present invention relates to cost minimization and more particularly to performing route optimization of services provided by multiple service providers for combined links.

2. Background Information

A computer network is a geographically distributed collection of interconnected communication links and segments for transporting data between nodes, such as computers. Many types of network segments are available, with the types ranging from local area networks (LANs) to wide area networks (WANs). LANs typically connect personal computers and workstations over dedicated, private communications links located in the same general physical location, such as a building or a campus. WANs, on the other hand, typically connect large numbers of geographically dispersed nodes over long-distance communications links, such as common carrier telephone lines. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other.

Computer networks may be further interconnected by an intermediate network node, such as a router, having a plurality of ports that may be coupled to the networks. To interconnect geographically dispersed computer networks and/or provide Internet connectivity, many organizations rely on the infrastructure and facilities of one or more Service Providers (SPs), such as an Internet service provider (ISP). ISPs typically own one or more backbone networks that are configured to provide high-speed connections to e.g., the Internet.

To enhance availability, some organizations (clients) subscribe to one or more ISPs. Here, a router may be employed as a "gateway" that couples the client's network to the ISPs' networks. If a particular ISP's network becomes unavailable, the router may be configured to automatically shift traffic (data) away from the unavailable ISP network to an available ISP network. The router may also be configured to utilize the multiple ISP networks in a manner that enhances overall network performance. For example, if a particular ISP connection becomes heavily used thereby potentially causing poor performance, a portion of the client's traffic may be redirected by the router from the heavily used connection to another less used ISP's connection in order to improve the overall network performance of the client's network. Moreover, the router may employ a "load-sharing" scheme where traffic handled by the router is distributed among the various ISP connections in a manner that avoids overloading any one ISP connection.

A client may enter into a service level agreement (SLA) with an ISP in order to establish a level of service provided by the ISP and a price the client pays for that service. Often different ISPs employ different pricing schemes for their services. For example, some ISPs charge clients on a flat-rate basis where each client pays a fixed fee per billing period regardless of how much of the ISP's service the client uses. Other ISPs may charge clients using a tiered pricing scheme that is dependent upon the amount of the service utilized by the client. In a typical tiered pricing arrangement, an ISP may i) take periodic measurements of egress and ingress traffic carried on the client's connection to the ISP's network and aggregate the measurements to generate a "rollup value" for a rollup period, ii) generate one or more rollup values per billing period, iii) rank the rollup values for the billing period in a stack from the largest value to the smallest, iv) discard a percentage of the highest rollup values from the stack to accommodate bursting, v) apply the highest remaining rollup value in the stack to a tiered structure to determine a tier associated with the rollup value, and v) charge the client based on a cost associated with the determined tier. A rollup value, as used herein, is an aggregate of measurements taken, e.g., of ingress and/or egress traffic, over a period of time, which is referred to herein as a rollup period.

Usually in a tiered pricing scheme, the egress and ingress traffic are measured separately and the measurements are then rolled up (aggregated) either separately or in a combined manner to the produce one or more rollup values. For example, rolling up measurements separately may involve combining (aggregating) the egress measurements to generate an egress rollup value and combining (aggregating) the ingress measurements to generate an ingress rollup value. In a combined arrangement, the egress and ingress measurements may be combined (aggregated) to generate a single combined rollup value.

The method employed to determine which rollup values are discarded often varies among ISPs. Methods typically employed include sum, separate, and combined discard calculation methods. The way the rollup numbers are generated and the number of ranked stacks used often depend on the discard method. For example, the sum discard method combines egress and ingress measurements to generate the rollup values, which are then ordered on a single ranked stack. The combined and separate discard calculation methods generate separate egress and ingress rollup values that are then ordered on single and separate ranked stacks, respectively.

FIG. 1 illustrates these discard calculation methods for a rollup value discard percentage of 6% (rounded), a rollup period of one day, and a billing period of thirty days. Ranked stacks 110 and 120 illustrate the separate discard calculation method. Here, egress and ingress measurements for a rollup period are aggregated separately to produce separate egress and ingress rollup values. The rollup values for a billing period are then used to generate an egress data ranked stack 110 and an ingress data ranked stack 120. The percent of rollup values discarded is applied to each ranked stack to determine the rollup values that are discarded. In this example, thirty egress and thirty ingress rollup values are generated in the billing period and placed on the egress 110 and ingress 120 ranked stacks, respectively. The values in each stack are ordered from the largest value at the top of the stack to the smallest value at the bottom. The two largest rollup values i.e., the values for days 12 and 22 for the egress stack 110 and days 15 and 18 for the ingress stack 120, are discarded (removed) from the top of each stack. The remaining highest rollup value in each stack, i.e., the rollup value for day 3 for the egress stack 110 and day 5 for the ingress stack 120, is then used to determine the amount the client is billed for the billing period.

Stack 130 illustrates the sum discard calculation method. According to this method, each egress and ingress measurement for a rollup period are summed to produce a single rollup value per rollup period. The rollup values for a billing period are then ranked on a single stack, the percentage of rollup values discarded is applied to the stack to determine the rollup values that are discarded, the rollup values are discarded, and the client is billed based on the remaining highest rollup value, as described above. Thus, for example, for stack 130, thirty summed rollup values are generated per billing period, the top two rollup values are discarded (i.e., the rollup values for days 12 and 15), and the client is billed based on the remaining highest rollup value in the stack (i.e., the rollup value for day 22).

Stack 140 illustrates the combined discard calculation method. Here, the egress and ingress measurements are rolled up into separate rollup values. The egress and ingress rollup values for a billing period are then ranked on a single ranked stack, the percent of discarded rollup values is applied to the stack to determine the number of discarded rollup values, the discarded rollup values are discarded from the stack and the client is billed based on the remaining highest rollup value, as described above. Thus, for example, stack 140 contains sixty rollup values (i.e., thirty egress rollup values and thirty ingress rollup values), the top four rollup values are discarded (i.e., the egress rollup values for days 12 and 3, and the ingress rollup values for days 15 and 12), and the client is billed based on the remaining highest rollup value in the stack (i.e., the egress rollup value for day 7).

A client that subscribes to multiple SPs may want to maximize usage of the SPs' services while minimizing the cost associated with those services. In a data network arrangement, such as described above, this may involve continually i) monitoring access to the various SP networks, ii) determining which SP connection best suits utilization of the SPs services based on cost and iii) reconfiguring the network to distribute utilization of the services in a manner that utilizes the least-costly SP connections. Depending on the network configuration, performing these actions may be costly and arduous to implement and consequently may not be sufficiently efficient and/or accurate to effect significant cost savings.

Moreover, the billing period for different SPs may not be synchronized. For example, the billing period for a first SP may be from the beginning of the month to the end of the month whereas the billing for a second SP may start at the middle of a month and end in the middle of the next month. This may act to further complicate trying to maximize usage while minimizing cost among a plurality of SPs.

Often, users organize communication links as a group for a variety of reasons known to those skilled in the art. For example, link groups may be used for increasing the available bandwidth between two points in the network, e.g., by combining multiple smaller/slower links into a single group of links that produces a greater bandwidth value than the smaller/slower links individually. Various forms of grouped links include link bonding/aggregation, EtherChannel, multilink point-to-point protocol (PPP), which is described in RFC 1717, entitled *The PPP Multilink Protocol (MP)*, published November 1994, etc. Other examples of link groups that will be understood by those skilled in the art include multiple VPN tunnels that are created between an enterprise network and a remote office, multiple links that share a common cost structure (e.g., as in an SLA), multiple links that are used in a common load-balancing scheme, etc.

Currently, however, routing policies and route optimization techniques (e.g., Optimized Edge Routing, OER) operate on individual links and not groups of links. As a result, conventional single-link techniques are often cumbersome when applied to groups of links, and limited control is available to users desiring greater ability to manage and optimize groups of links for a variety of purposes, in addition to those mentioned above. Particularly, users with SLAs having common cost structures for combined links do not have the ability to optimize routes based on the combined link costs. There remains a need, therefore, for a technique that performs route optimization of services provided by one or more service providers for combined links in a computer network.

SUMMARY OF THE INVENTION

The present invention is directed to a technique for performing route optimization of services provided by one or more service providers (SPs) for communication links that are combined in a computer network. According to the novel technique, performance characteristics and statistics ("link data") for two or more combined links are merged to form link data for a single "virtual combined link." Route optimization techniques may then be applied to one or more virtual combined links based on the combined link data, in addition to link data for zero or more conventional single links (physical or virtual). For example, service level agreements (SLAs) for particular SPs may combine the link data of all traffic into the SP's network, e.g., bandwidth used, in order to bill a client. As a result, it may be advantageous to optimize traffic routed into this SP's network based upon the combined link data (e.g., for priority-based route optimization techniques). Also, the same strategy may apply to other types of bonded/aggregated links, as will be understood by those skilled in the art. For instance, given two groups of aggregated links, it may be more beneficial to compare the total cost of each group, rather than the cost of each individual link of the groups.

Illustratively, a route optimization technique may be used in accordance with the present invention to efficiently and accurately minimize costs associated with services provided by a plurality of SPs, wherein each SP charges for utilization of its service based on a tiered pricing structure. The tiered pricing structure comprises one or more tiers, wherein each tier correlates to an amount of service provided by the SP and an associated cost.

According to the illustrative route optimization technique, measurement data that represents the utilization of the SPs' services is collected. At the end of a rollup period, one or more rollup values are generated from the measurement data collected during a rollup period. For the first N/P+1 rollup periods in a billing period where "N" is the number of discarded rollup values and "P" is the number of rollup values generated each rollup period, based upon the measurement data and the SPs' tiered cost structures, utilization of the SPs' services is distributed among the SPs by "walking up" the SPs' tiered cost structures and distributing the utilization in a manner that minimizes the cost of the services provided by the SPs. At the end of a rollup period, the measured data is used to generate rollup values, which are cumulated in a ranked stack.

For the remaining rollup periods in the billing period, for each SP, a target tier, which represents a tier in the SP's tiered pricing structure, is generated based on the cumulated rollup values. Within a rollup period measurement data is collected that represents the utilization of each SP's service. A momentary target utilization rate (MTUR), which represents a cumulative utilization of an SP's services at a particular instance of time e.g., within the rollup period, is generated for each SP based on, inter alia, the target tier and the measurement data. The utilization of the SPs' services is distributed among the SPs based on the MTUR and tiered pricing structure of each SP in a manner that minimizes the cost of the services provided by the SPs. If during the rollup period, the measurement data indicates the target tier has been exceeded, a new target tier is generated for the SP. At the end of a rollup period, the measurement data is used to generate a rollup value for the period, which is cumulated in the ranked stack.

Advantageously, the present invention performs route optimization of services provided by one or more SPs for communication links that are combined in a computer network. By combining the link data for two or more combined links, and managing route optimization based on the combined link data, the present invention enhances the control of routes and flow of traffic, e.g., in such a way so as to more closely reflect SLA policies having combined links. The present invention also illustratively incorporates an efficient and accurate route optimization technique for minimizing cost associated with services provided by a plurality of SPs by being cognizant of the SPs' cost structures, actively monitoring utilization of the SPs' services, and distributing utilization among the SPs as necessary in a manner that minimizes the cost of the services provided by the SPs. Moreover, the illustrative route optimization technique does not require that the billing periods between SPs be synchronized, as the target tier for each SP is determined independently.

BRIEF DESCRIPTION OF THE DRAWINGS

The above and further advantages of the invention may be better understood by referring to the following description in conjunction with the accompanying drawings in which like reference numerals indicate identically or functionally similar elements, of which:

FIG. 1 is an illustration of various discard calculation methods;

FIGS. 7A-B are a table that illustrates generating target tiers in accordance with an embodiment of the invention using the sum calculation method;

FIGS. 8A-B are a table that illustrates generating target tiers in accordance with an embodiment of the invention using the combined calculation method;

FIGS. 9A-C are a table that illustrates generating target tiers in accordance with an embodiment of the invention using the separate calculation method;

DETAILED DESCRIPTION OF AN ILLUSTRATIVE EMBODIMENT

Figure 2:
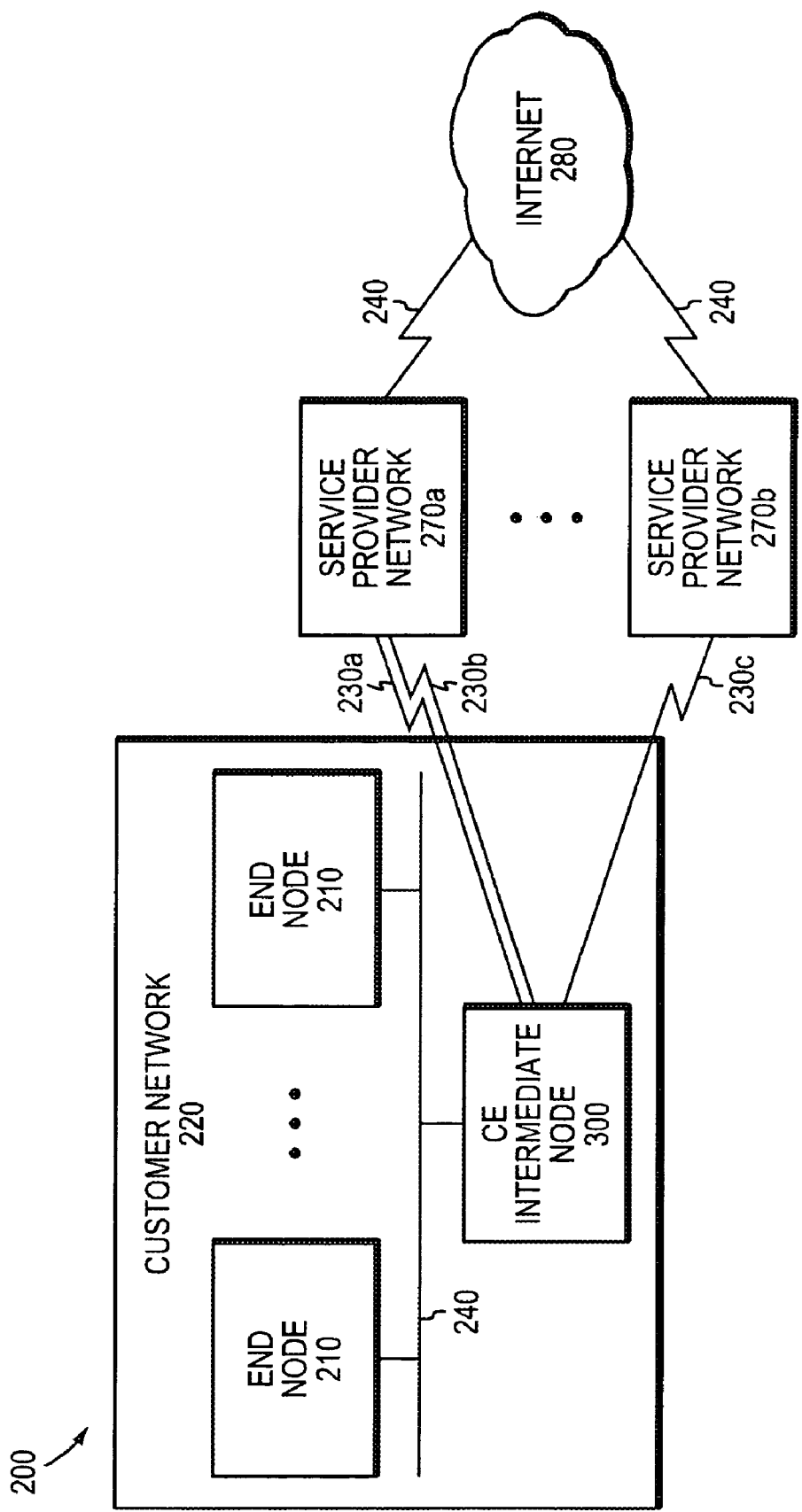
FIG. 2 is a schematic block diagram of a computer network that may be advantageously used with the present invention.

FIG. 2 is a schematic block diagram of a computer network that may be advantageously used with the present invention. Computer network 200 comprises a customer network 220 coupled to a wide-area network (WAN), such as the Internet 280, via a plurality of service providers (SPs) 270 to create a network of internetworked nodes. Specifically, the customer network 220 comprises one or more end nodes 210, coupled to an intermediate node 300, such as customer edge (CE) intermediate node 300, via a local-area network (LAN) connection 240. Intermediate node 300 is coupled via one or more WAN communication links 230 (e.g., 230a-c) to each service provider 270 that, in turn, is coupled to the Internet 280 via communication links 240. Each service provider network 270 may contain one or more network nodes (not shown), such as aggregation routers, that are interconnected via various communication links to form a data network that enables customer network 220 to access the Internet 280. The internetworked nodes may contain computer systems that enable the nodes to intercommunicate by exchanging data packets according to a predefined set of protocols, such as the Transmission Control Protocol/Internet Protocol (TCP/IP).

Figure 3:
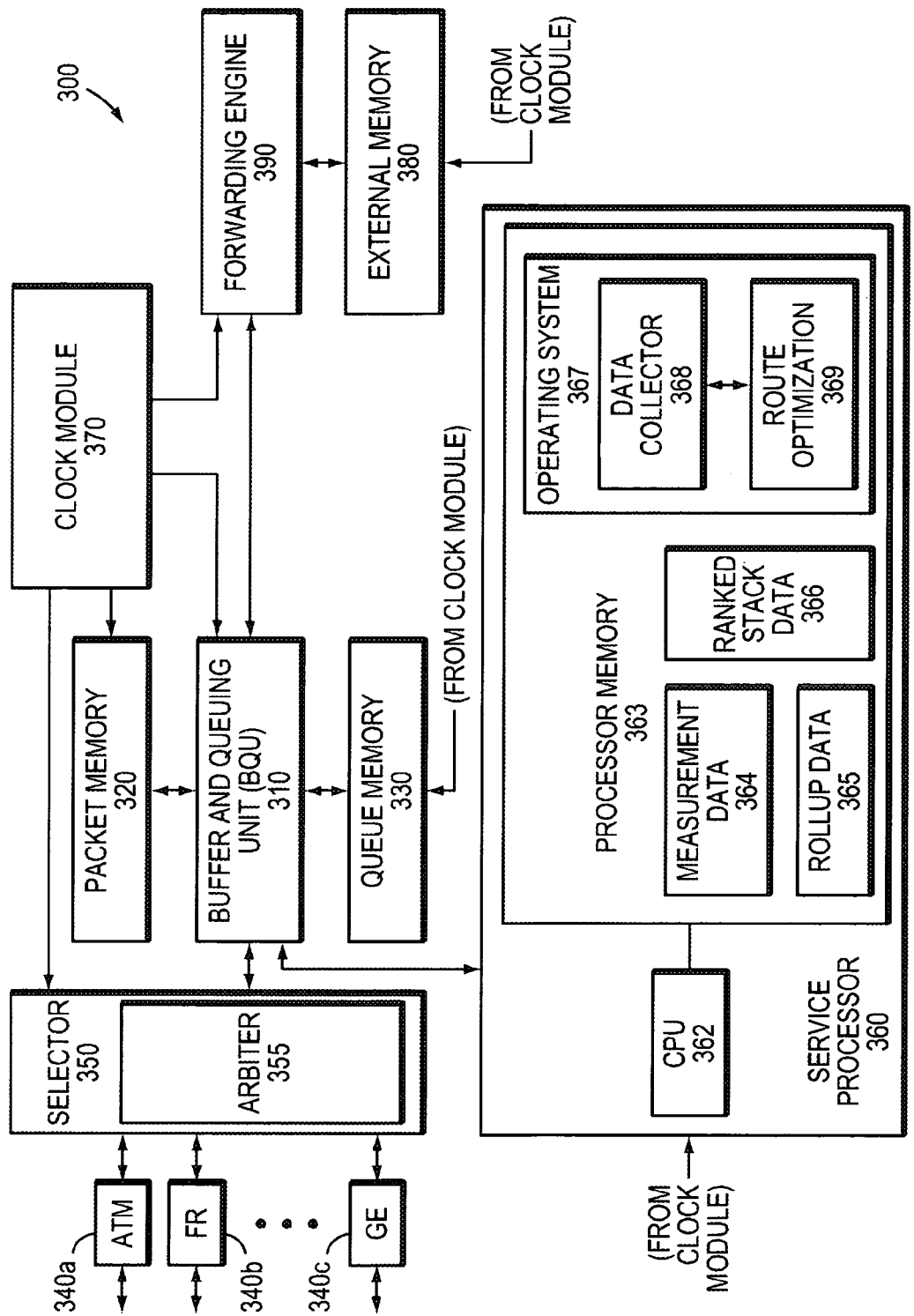
FIG. 3 is a high-level partial schematic block diagram of an intermediate node that may be advantageously used with the present invention.

FIG. 3 is a high-level partial schematic block diagram of intermediate node 300, which illustratively is a router. An example of a router that may be advantageously used with the present invention is the Cisco 7200 Series Internet Router available from Cisco Systems Incorporated, San Jose, Calif. Operation of router 300 will be described with respect to IP routing, although the router 300 may be configured for other applications, such as encryption.

Router 300 comprises a plurality of interconnected components including a forwarding engine 390, various memories, queuing logic 310, selector 350, service processor 360, and network interface cards (line cards) 340. A clock module 370 synchronously controls operations of various components contained in router 300, although it should be noted that arrayed elements of the forwarding engine 390 (described below) may be operatively configured to function asynchronously. In the illustrative embodiment, the clock module 370 generates clock signals at a frequency of, e.g., 200 megahertz (i.e., 5 nanosecond clock cycles), and globally distributes them via clock lines to the various components of the router 300.

A buffer and queuing unit (BQU) 310 is connected to a packet memory 320 for storing packets and a queue memory 330 for storing network-layer and link-layer headers of the packets on data structures, such as linked lists, organized as queues (not shown). The BQU 310 further comprises data interface circuitry for interconnecting the forwarding engine 390 and service processor 360 with the line cards 340 via a selector circuit 350 having an arbiter 355. The line cards 340 may comprise, e.g., Asynchronous Transfer Mode (ATM), Frame Relay (FR) and Gigabit Ethernet (GE) ports, each of which includes conventional interface circuitry that may incorporate the signal, electrical and mechanical characteristics, and interchange circuits, needed to interface the cards with the physical media and protocols running over that media.

The forwarding engine 390 may comprise a symmetric multiprocessor system having a plurality of processing elements (not shown). Each processing element illustratively includes a pipelined processor that contains, inter alia, a plurality of arithmetic logic units (ALUs) and a register file having a plurality of general purpose registers that store intermediate result information processed by the ALUs. The processing elements may be arrayed into multiple rows and columns, and further configured as a multi-dimensional systolic array. Illustratively, the processing elements are arrayed as four (4) rows and eight (8) columns in a 4×8 arrayed configuration that is embedded between an input buffer (not shown) and an output buffer (not shown). However, it should be noted that other arrangements, such as an 8×8-arrayed configuration, may be advantageously used with the present invention.

The processing elements of each row are configured as stages of a "pipeline" that sequentially execute operations on transient data (e.g., packet headers) loaded by the input buffer, whereas the processing elements of each column operate in parallel to perform substantially the same operation on the transient data, but with a shifted phase. Each phase comprises a predetermined period of cycles, e.g., 128 cycles. Sequencing circuitry of the input buffer controls the processing elements of each pipeline by ensuring that each element completes processing of current transient data before loading new transient data into the pipeline at a new phase. In general, a new phase of processing is started, i.e., a context switch is performed, when the elements finish processing their current transient data (current context) and new incoming transient data (new context) is completely received by the input buffer.

The forwarding engine 390 is coupled to an external memory 380 a portion of which is partitioned into a plurality of "column" memories wherein each column memory is coupled to a particular column of processing elements. Memory 380 is preferably organized as one or more banks and is implemented using fast-cycle-random-access-memory (FCRAM) devices, although other devices, such as reduced-latency-dynamic-random-access-memory (RLDRAM) devices, could be used. The external memory 380 stores non-transient data, such as a forwarding database, organized as a series of data structures for use in processing the transient data.

The service processor 360 comprises a conventional central processing unit (CPU) 362 coupled to a processor memory 363. The CPU 362 is a processor that contains conventional logic that enables the CPU 362 to access memory 363 and execute and manipulate data contained therein. The processor memory 363 is a computer readable medium containing e.g., high-speed random-access memory (RAM) memory devices, such as dynamic-random-access-memory (DRAM) devices. Memory 363 further contains an operating system 367 and various data structures. The operating system 367 comprises computer executable instructions (code) that functionally organize the service processor 360 to enable performance of various functions, including functions that incorporate aspects of the inventive technique. It should be noted that one skilled in the art would realize that other computer readable media, such as a disk drive or one or more flash memory devices, may be used to store computer executable instructions that implement the inventive technique described herein.

Functions performed by the operating system 367 include, inter alia, execution of conventional routing protocols, such as the Open Shortest-Path First (OSPF) protocol and the Border Gateway Protocol (BGP). The routing protocols generally comprise topological information exchanges between intermediate nodes to determine preferred paths through the network based on, e.g., destination IP addresses. These protocols provide information used by the service processor 360 to create and maintain various forwarding databases (not shown) contained in external memory 380. The databases are used by the forwarding engine 390 to perform, e.g., layer-2 (L2) and layer-3 (L3) forwarding operations. When processing a packet's header in accordance with IP routing, for example, engine 390 determines where to send the packet by indexing into a forwarding database contained in memory 380 using an IP address contained in the header. Execution of the forwarding operations may result in destination media access control (MAC) address of the packet's header being rewritten by the forwarding engine 390 to identify an output port associated with the packet.

Illustratively, a route optimization technique may be used in accordance with the present invention to efficiently and accurately minimize costs associated with services provided by a plurality of service providers (SPs), wherein each SP charges for utilization of its service based on a tiered pricing structure. The tiered pricing structure comprises one or more tiers, wherein each tier correlates to an amount of service provided by the SP and an associated cost.

According to the illustrative route optimization technique, measurement data that represents the utilization of the SPs' services is collected. At the end of a rollup period, one or more rollup values are generated from the measurement data collected during a rollup period. For the first N/P+1 rollup periods in a billing period where "N" is the number of discarded rollup values and "P" is the number of rollup values generated each rollup period, based upon the measurement data and the SPs' tiered cost structures, utilization of the SPs' services is distributed among the SPs by "walking up" the SPs' tiered cost structures and distributing the utilization in a manner that minimizes the cost of the services provided by the SPs. At the end of a rollup period, the measured data is used to generate rollup values, which are cumulated in a ranked stack.

For the remaining rollup periods in the billing period, for each SP, a target tier, which represents a tier in the SP's tiered pricing structure, is generated based on the cumulated rollup values. Within a rollup period measurement data is collected that represents the utilization of each SP's service. A momentary target utilization rate (MTUR), which represents a cumulative utilization of an SP's services at a particular instance of time e.g., within the rollup period, is generated for each SP based on, inter alia, the target tier and the measurement data. The utilization of the SPs' services is distributed among the SPs based on the MTUR and tiered pricing structure of each SP in a manner that minimizes the cost of the services provided by the SPs. If during the rollup period, the measurement data indicates the target tier has been exceeded, a new target tier is generated for the SP. At the end of a rollup period, the measurement data is used to generate a rollup value for the period, which is cumulated in the ranked stack.

Operating system 367 comprises code organized as e.g., software processes that operate under the control of the operating system 367 and enable service processor 360 to monitor utilization of the SPs' 270 services and perform cost minimization of the services provided by the SPs 270 in accordance with the inventive technique. Illustratively, these processes include a data collector process 368 and a route optimization process (e.g., a cost minimization process) 369. The data collector 368 comprises code configured to collect information (data) associated with the customer network's 220 utilization of the SPs' services illustratively in a manner that is similar to the information collected by the individual SPs 270. This data may represent data utilized by each SP to determine an amount billed by the SP for a billing period. Illustratively, the data collected includes the number of ingress and egress octets transferred on the communication links 230 between intermediate node 300 and the SPs 270. The cost minimization process 369 contains code that processes the collected data and configures node 300 to distribute utilization of the SPs' services in a manner that minimizes the cost of the services provided by the SPs.

Measurement data 364 is a data structure that illustratively holds data collected by the data collector 368. The cost minimization process 369 generates rollup values from this data and places these rollup values in the rollup data 365, which is a data structure configured to hold these values. Illustratively, the rollup values comprise an aggregation of the measurement data collected by the data collector 368 for a rollup period.

The ranked stack data 366 contains one or more ranked stacks of rollup values (not shown) organized as one or more ordered sets. An ordered set as used herein is a set "M" of values wherein the value M(k) is greater than or equal to the value M(k+1). It should be noted that sets ordered in a different manner, such as a set "M" wherein M(k) is less than or equal to M(k+1), may take advantage of the inventive technique. For each SP 270, the number of ranked stacks (sets) generated depends on the discard calculation method used by the SP. For example, separate ranked stacks are generated for the egress and ingress rollup values for the separate discard calculation method, whereas for the sum and combined methods, a single stack is generated Asseme, for example, SP 270a (FIG. 2) bills for its service based on the tiered pricing structure illustrated in table 1.

TABLE 1

| Tier | Percent Utilization (rounded) | Cost |
|---|---|---|
| 1 | 0 to 20 | $12,000 |
| 2 | 21 to 40 | $14,000 |
| 3 | 41 to 60 | $16,000 |
| 4 | 61 to 80 | $20,000 |
| 5 | 81 to 100 | $26,000 |

Likewise, assume SP 270b bills for its service based on the tiered pricing structure illustrated in table 2.

TABLE 2

| Tier | Percent Utilization (rounded) | Cost |
|---|---|---|
| 1 | 0 to 45 | $13,000 |
| 2 | 46 to 52 | $17,200 |
| 3 | 53 to 58 | $18,900 |
| 4 | 59 to 65 | $20,500 |
| 5 | 66 to 77 | $24,000 |
| 6 | 78 to 90 | $26,600 |
| 7 | 91 to 100 | $27,900 |

Further, assume each SP 270 bills for at least the first tier regardless of whether the any service is utilized, each SP 270 discards 6% (rounded) of the rollup values generated for each billing period and the number of rollup periods per billing period is 30. Moreover, assume for the sum discard calculation method one rollup value is generated per rollup period comprising the sum of the egress and ingress measurements for the rollup period. In addition, for the combined and separate discard calculation methods, assume two rollup values are generated per rollup period which includes an egress rollup value that comprises the sum of the egress measurements for the rollup period and an ingress rollup value that comprises the sum of the ingress measurements for the rollup period.

Figure 4:
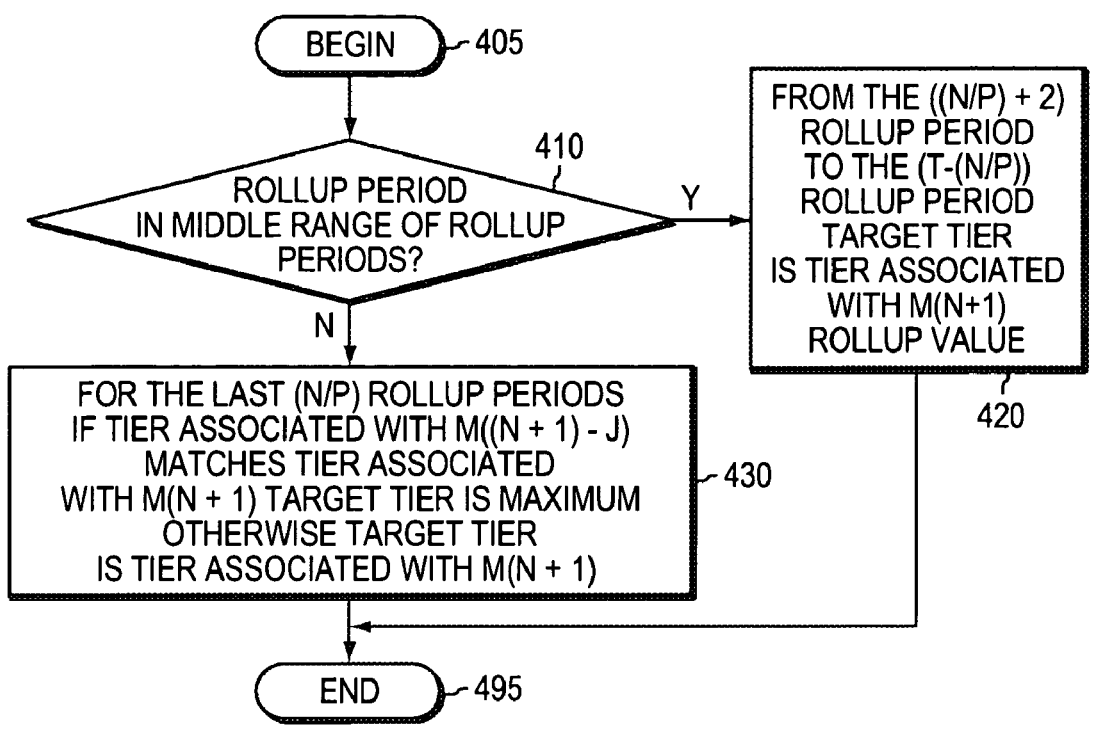
FIG. 4 is a flow diagram of a sequence of steps that may be used to generate a target tier in accordance with an embodiment of the invention using either a sum or combined discard calculation method.

FIG. 4 is a flow diagram of a sequence of steps that may be used to generate a target tier for a rollup period in accordance with an embodiment of the invention where the SP uses either the sum or combined discard calculation method. As used herein, "N" is the number of rollup values discarded by an SP in a billing period and "P" is the number of rollup values generated in a rollup period.

The sequence begins at Step 405 and proceeds to Step 410 where a check is performed to determine if the rollup period is in the "middle range" of rollup periods. Illustratively, the middle range of rollup periods include the periods that fall within the range of the "N/P+2" rollup period to the "T−N/P" rollup period, inclusive, wherein "T" is the total number of rollup periods per billing period. If the rollup period is in the middle range of rollup periods, the sequence proceeds to Step 420, where the target tiers for the middle range of rollup periods are generated. Where M(k) is the "k-th" highest rollup value in the set M rollup values generated so far in the billing period, the target tier generated is the tier in the SP's cost structure that is associated with the M(N+1) rollup value. For example, assume SP 270a uses the sum discard calculation method, N is equal to 2 and the rollup values for the first four rollup periods are 21, 15, 48 and 35 indicating 21%, 15%, 48% and 35% utilization, respectively. Set M is represented as {48, 35, 21, 15} and the M(N+1) rollup value is 21. The tier in SP 270a's pricing structure associated with this value is 2; thus, the target tier generated is 2. The sequence then ends at Step 495.

At Step 430 the target tier is generated for the last N/P rollup periods. Specifically, if the pricing structure tier associated with the M((N+1)−J) rollup value, where "J" is the number of rollup values yet to be generated, matches the pricing structure tier associated with M(N+1) rollup value, the generated target tier is a "maximum" tier (described below). Otherwise, the generated target tier is the tier associated with the M(N+1) rollup value. For example, assume, as above, that SP 270a uses the sum discard calculation method, N is equal to 2, the set M is represented as {65, 62, 48, 35, 30, 30, 26, 21, 15, . . . } and there is one more rollup value to be generated for the billing period. Since the pricing structure tier associated with M((N+1)−J) rollup value, i.e., 4, is not equal to the pricing structure tier associated with M(N+1) rollup value, i.e., 3, the generated target tier is the tier associated with the M(N+1) rollup value which is tier 3. At Step 495 the sequence ends.

Illustratively, a target tier that is a "maximum" tier relates to a tier that ensures a maximum safe capacity limit for the service and leaves sufficient "headroom" to avoid bursting beyond the service's full capacity. For example, if the link 230 (FIG. 2) coupling node 300 with SP 270a is a 155 Megabits-per-second (Mps) link, to ensure 20% headroom to accommodate bursting the maximum target tier would be the tier associated with up to 80% utilization of the link which is tier 4.

Figure 5:
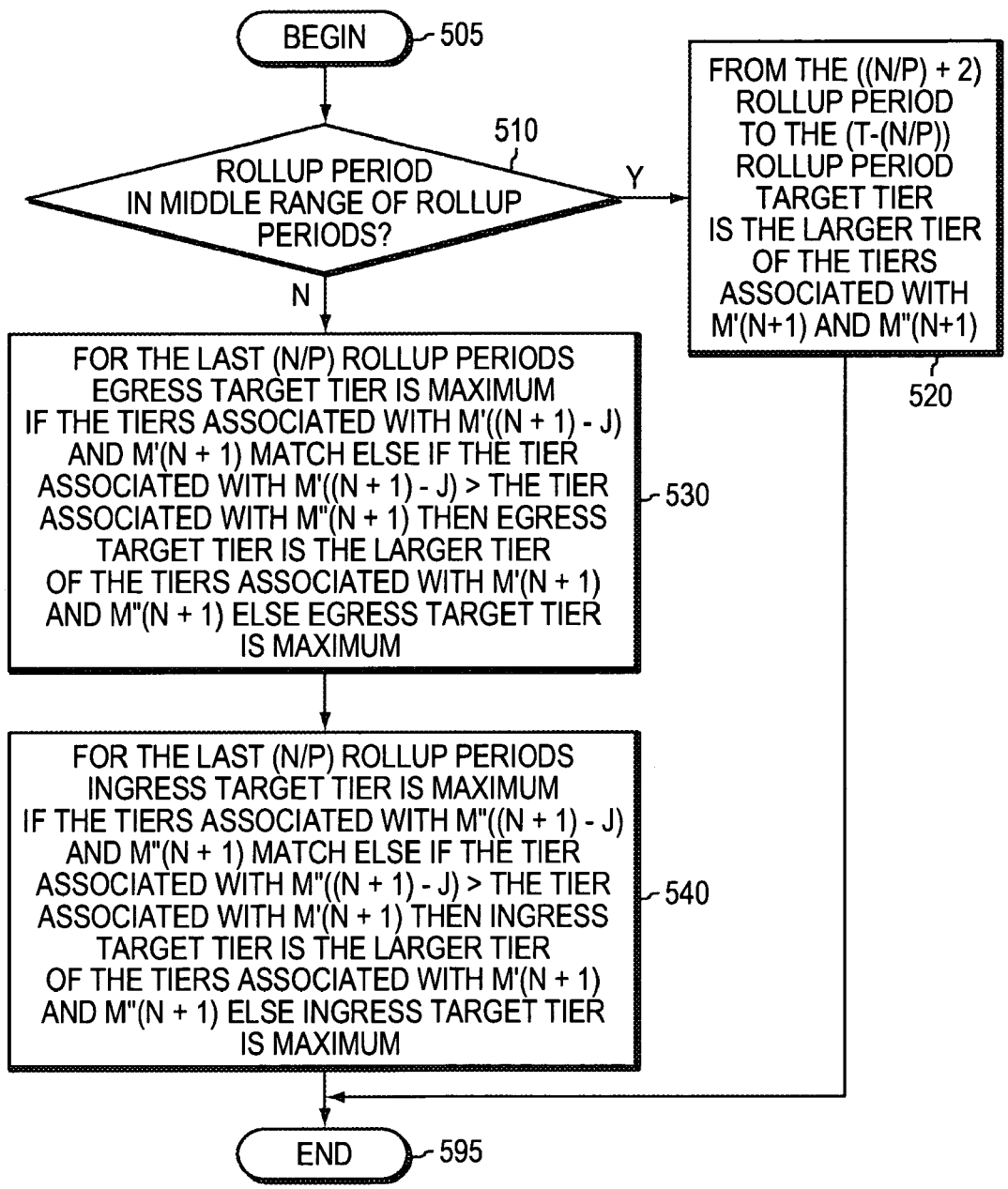
FIG. 5 is a flow diagram of a sequence of steps that may be used to generate a target tier in accordance with an embodiment of the invention using a separate discard calculation method.

FIG. 5 is a flow diagram of a sequence of steps that may be used to generate a target tier for a rollup period in accordance with an embodiment of the invention where the SP uses the separate discard calculation method. As noted above, for the separate discard calculation method, separate egress and ingress rollup values are generated from the egress and ingress measurement data, respectively, that is collected by the data collector 368. These rollup values are ordered in separate egress and ingress ranked stacks (sets), respectively, contained in the ranked stack data 366. The separate egress and ingress ranked stacks (ordered sets) are represented herein by the set notation as M' for the egress ranked stack (egress ordered set) and M" for the ingress ranked stack (ingress ordered set).

The sequence begins at Step 505 and proceeds to Step 510 where a check is performed to determine if the rollup period is in the middle range of rollup periods (described above). If so, the sequence proceeds to Step 520 where the target tiers for the middle range of rollup periods are generated. Specifically, for each SP 270, the cost minimization process 369 determines if the SP's 270 pricing structure tier associated with M'(N+1) rollup value is greater than the SP's 270 pricing structure tier associated with M"(N+1) rollup value. If so, the cost minimization process 369 generates a target tier that is a tier in the SP's 270 tier pricing structure associated with the M'(N+1) rollup value in the egress ordered set. Otherwise, the generated target tier is the tier in the SP's 270 tier pricing structure associated with the M"(N+1) rollup value in the ingress ordered set. For example, for SP 270a, assume the M'(N+1) rollup value indicates 64% utilization and the M"(N+1) rollup value indicates 42% utilization of SP 270a's services. The pricing structure tier associated with the M'(N+1) rollup value is 4 which is greater than the pricing structure tier associated with the M"(N+1) rollup value which is 3; thus, the generated target tier is 4. The sequence then ends at Step 595.

At Steps 530 and 540, the egress and ingress target tiers are generated, respectively, for the last N/P rollup periods. Specifically, at Step 530, the cost minimization process 369 determines if the SP's 270 pricing structure tier associated with M'((N+1)-J') rollup value matches the SP's 270 pricing structure tier associated with M'(N+1) rollup value, where "J'" is the remaining number of egress rollup values to be generated. If so, process 369 generates a target tier that is a maximum tier in a manner that is described above. Otherwise, process 369 determines if the SP's 270 pricing structure tier associated with M'((N+1)-J') rollup value is greater than the SP's 270 pricing structure tier associated with M"(N+1) rollup value and if so, generates a target tier that is larger of the tiers in the SP's 270 pricing structure associated with the M'(N+1) and M"(N+1) values. Otherwise, process 369 generates a target tier that is a maximum tier.

At Step 540, the cost minimization process 369 determines if the SP's 270 pricing structure tier associated with M"((N+1)-J") rollup value matches the SP's 270 pricing structure tier associated with M"(N+1) rollup value, where "J''" is the remaining number of ingress rollup values to be generated. If so, process 369 generates a target tier that is a maximum tier. Otherwise, process 369 determines if the SP's 270 pricing structure tier associated with M"((N+1)-J") rollup value is greater than the SP's 270 pricing structure tier associated with M'(N+1) rollup value and if so, generates a target tier that is the larger of the tiers in the SP's 270 tier pricing structure associated with the M'(N+1) and M"(N+1) values. Otherwise, process 369 generates a target tier that is a maximum tier. The sequence ends at Step 595.

Illustratively, in accordance with an embodiment of the invention, an SP's 270 target tier is generated at the beginning of a rollup period. Within an SP's 270 rollup period, a momentary target utilization rate (MTUR) is generated. The MTUR indicates the cumulative utilization of an SP's 270 services at a particular time within the rollup period. Illustratively, the MTUR is represented as a percentage of the total available services that have been utilized within the rollup period. As will be described below, the MTUR is used to determine if an SP's 270 target tier has been exceeded. If so, a new target tier is generated and the utilization of the SP's 270 services is redistributed among the SPs 270 based on each SP's 270 MTUR and the target tier.

Illustratively, the MTUR for a data link coupled to an SP 270 is calculated using the following formula:

$$MTUR = TMU + ((TMU*LC*TSI) - CTM)/(LC*(TS-TSI)) \text{ clipped at a } MUC$$

wherein:
MTUR is the momentary target utilization rate expressed as a percentage of utilization of services expressed as a percentage;
CTM is the cumulative traffic for a rollup period measured in Megabytes (Mb);
TS is the total number of seconds in a rollup period;
TSI is the number of seconds into the rollup period;
TMU is the target tier maximum utilization expressed as a percentage;
LC is the data-link capacity in Megabytes-per-second (Mps); and
MUC is a maximum usable capacity in percentage of overall capacity associated with the "maximum" tier (described above) expressed as a percentage.

For example, assume the TMU is 60%, the CTM is $2.16 \times 10^{12}$, TS is $8.64 \times 10^4$, TSI=$4.32 \times 10^4$, LC is $1 \times 10^8$ Mps and MUC is 80%. The MTUR is 70%. Thus, at this point in time in the rollup period, utilization may reach 70% without having to increase the target tier to the next pricing structure tier.

As noted above, the result generated by the formula is clipped at the MUC. This means that the MTUR is the lesser of the MUC and the result generated by the formula.

Figure 6:
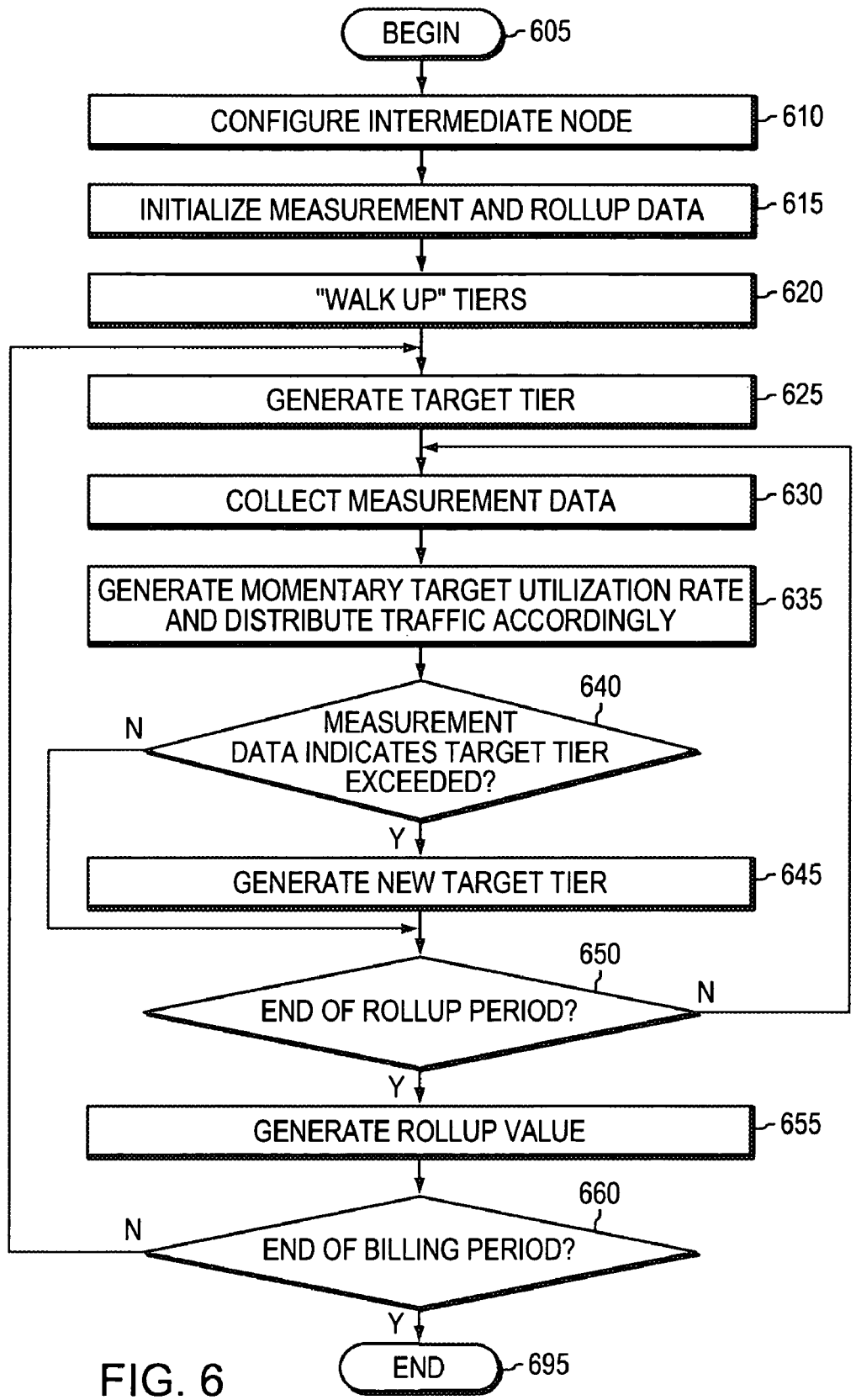
FIG. 6 is a flow chart of a sequence of steps that may be used to cost minimize connections between an intermediate node and a plurality of service providers for a billing period in accordance with an embodiment of the invention.

FIG. 6 is a flow chart of a sequence of steps that may be used to cost minimize connections between node 300 and the SPs 270 for a billing period (cycle) in accordance with an embodiment of the invention. The sequence begins at Step 605 and proceeds to Step 610 where node 300 is configured with information associated with the services provided by the SPs 270. This information may include information used by each SP 270 to bill for services provided by the SP, such as the type of data measured during each rollup period (e.g., egress/ingress octets transferred between the customer's network 220 and the SP 270), the sampling period or measurement interval (e.g., 5 minutes), the rollup period (e.g., 24 hours), the billing period (e.g., 30 days), discard amount (e.g., 6% rounded), the discard calculation method (e.g., summed, combined, separate), and the SP's tier pricing structure. Other information may include the billing start date and the time zone difference between the time zone of the intermediate node 300 and the time zone of the SP 270.

At Step 615, the cost minimization process 369 initializes the measurement 364 and rollup 365 data. At Step 620, for the first N/P+1 rollup periods the cost minimization process 369 distributes utilization of the SPs services among the SPs by "walking up" the pricing tiers and distributing utilization in a manner that minimizes the cost of the services provided by the SPs. "Walking up" the pricing tiers involves distributing utilization of the SPs' services among the SPs in a manner that minimizes the cost for the SPs' services as indicated in the SPs' tiered pricing structures. As noted above, since both SPs 270 charge for the first tier, process 369 illustratively distributes utilization of the SPs' services between both SPs evenly. When the aggregate utilization of SP 270a's services reaches 20%, node 300 shifts (distributes) the utilization of the SPs' services from SP 270a to SP 270b until the aggregate utilization of SP 270b's service reaches 45%. Likewise, when the aggregate utilization of SP 270b's services exceeds 45%, node 300 shifts the utilization of the SPs' services from SP 270b to SP 270a, since tier 2 and 3 for SP 270a are lower in cost than tier 2 for SP 270b. When the utilization of SP 270a's services exceeds tiers 2 and 3, node 300 shifts the utilization of the SPs' services from SP 270a to SP 270b and so on.

At Step 625, the cost minimization process 369 generates a target tier for each SP 270. Specifically, the cost minimization process 369 generates a target tier for each SP 270 using the method described in FIG. 4 (if the SP 270 uses the summed or combined discard calculation method) or the method described in FIG. 5 (if the SP 270 uses the separate discard calculation method).

At Step 630, the data collector 368 collects measurement data in a manner as described above and the cost minimization process 369 processes the collected data including generating an MTUR for each SP, in a manner as described above. Using the generated MTUR and target tier for each of the SPs 270 process 369 distributes utilization of the SPs' 270 services among the SPs 270 in a manner that maximizes the utilization of each SPs 270 services and minimizes the cost of the services provided by the SPs 270. For example, assume the MTUR for a first SP 270 indicates that a large percentage of the SP's 270 services available within its target tier have been used early in its rollup period. In response to this condition, process 369 may distribute utilization of the first SP's 270 services to a second SP 270 whose MTUR indicates a lower usage of its services within its rollup period and the cost associated with its target tier is lower than the cost associated with the next highest tier after the first SP's 270 target tier. Notably, using the MTUR in this manner enables the utilization of services to be better distributed among the SPs 270 and obviates having a particular SP 270 increase its target tier when lower cost services may be available from another SP 270.

At Step 640, for each SP 270 the cost minimization process 369 determines if the SP's 270 measurement data cumulated for a rollup period indicates the SP's 270 target tier has been exceeded. If so, the sequence proceeds to Step 645 where a new target tier is generated for the SP 270. Illustratively, the new target tier generated is the next tier in the SP's tiered pricing structure. Alternatively, the new target tier may be generated in a manner as described in FIGS. 4 and 5 above.

At Step 650, the cost minimization process 369 determines if the rollup period for a given SP 270 has ended. If not, the sequence returns to Step 630. Otherwise, the sequence proceeds to Step 655 where process 369 generates one or more rollup values from the measurement data collected during the rollup period and places the rollup values in one or more ordered sets contained in the rollup data 365. For example, if the SP 270 uses the separate discard calculation method, process 369 generates separate rollup values for the egress and ingress data, as described above. These rollup values are then placed 10 in the egress and ingress ranked stacks contained in the ranked stack data 366, respectively. At Step 660, the cost minimization process 369 determines if the billing period has ended. If not, the sequence returns to Step 620; otherwise the sequence ends at Step 695.

FIGS. 7A-B, 8A-B and 9A-C are exemplary tables that illustrate a way target tier values may be generated in accordance with an embodiment of the invention for the summed, combined, and separate discard calculation methods, respectively. The "sustained tier" indicated in the tables relates to the tier used for billing purposes for the billing period.

In the following descriptions of FIGS. 7, 8 and 9, assume for purposes of illustration that an SP's target tier associated with a rollup value is the same as the rollup value. Referring to FIGS. 7A-B, illustratively, the rollup period is one day with one rollup value generated per period. The total number of rollup periods in a billing period is 30 and the percent of rollup values discarded is 5% (rounded); thus the number of rollup values discarded, i.e., N, is 2. For the first N+1 rollup periods, i.e., rollup periods 1 through 3 inclusive, the rule that is applied is the "walk up the tiers" rule, i.e., Step 620 (FIG. 6).

From the N+2 rollup period through the T-N rollup period, i.e., periods 4 through 28 inclusive, the target tier is determined using the "M(N+1)" rule, i.e., Step 420 (FIG. 4). For example, at rollup period 10, the rollup value for the measured egress utilization is 6, the rollup value for the measured ingress utilization is 4, and the sum total rollup value is 10. Since this is the first highest measurement encountered so far, it is placed in the M(1) position of the ranked stack. The previous first highest value, i.e., 9, is moved to the M(2) position and the previous second highest value, i.e., 8 is moved to the M(3) position, i.e., the M(N+1) position. In accordance with the rule at Step 420, the target tier is set to the tier associated with the value 8 which is this case is tier 8.

After the T-N rollup period to the end of the billing period, i.e., rollup periods 29 and 30, the target tier is generated using the rule associated with Step 430. For example, at the beginning of rollup period 29, J is 2 and the rollup value at M((N+1)–J) is 11 (i.e., the highest value). Since this SP's tier associated with the rollup value for M((N+1)–J), i.e., 11, does not match the tier associated with the rollup value at M(N+1), i.e., 10, the target tier generated for period 29 is 10, i.e., the tier associated with the M(N+1). Likewise, at the beginning of rollup period 30, J is 1 and the tier associated with the rollup value for M((N+1)–J) is 10. Since this tier matches the tier associated with the rollup value at M(N+1), i.e., 10, the generated target tier is a maximum tier.

The table in FIGS. 8A-B is similar to the table illustrated in FIG. 7A-B except that the egress and ingress rollup values are maintained as separate rollup values rather than a single summed rollup value.

Referring to FIGS. 9A-C, for the first N+1 rollup periods, the rule that is applied is the "walk up the tiers" rule, i.e., Step 620. For the middle rollup periods, i.e., rollup period 3 through 28 inclusive, the rule at Step 520 is applied and ingress and egress generated target tiers are the tiers associated with the larger of the SP's pricing structure tier associated with the M'(N+1) or M"(N+1) rollup values. For example, at the beginning of rollup period 5, the tier associated with the M'(N+1) rollup value is 3 and the tier associated with the M"(N+1) rollup value is 2. Since 3 is greater than 2, the generated target tier is 3.

For the remaining rollup periods, i.e., periods 29 and 30, the target tier is generated using the rules associated with Steps 530 through 540. For example, at the beginning of rollup period 30, for the egress target value the rule associated with Step 530 is applied. Since the tier associated with the rollup value at M'(N+1)–J), i.e., 6, matches the tier associated with the rollup value at M'(N+1), the generated target tier is a maximum tier.

The present invention is directed to a technique for performing route optimization of services provided by one or more SPs for communication links that are combined in a computer network. According to the novel technique, performance characteristics and statistics ("link data") for two or more combined links are merged to form link data for a single "virtual combined link." Link data may be any type of monitored information for the two or more links that may be useful for route optimization, such as, e.g., bandwidth, utilization, bandwidth, cost, delay, packet loss, mean opinion score (MOS) (for Voice over IP, VoIP traffic), round trip time (RTT), etc. Also, various methods may be used to monitor and collect the link data (e.g., at the data collector 368), such as, for example, by using optimized edge routing (OER) techniques described in above-referenced patent application Ser. No. 11/336,734. Once the link data is collected for the two or more links, the data is combined appropriately, as will be understood by those skilled in the art. For instance, bandwidth and utilization may be added together, while delay or RTT, for example, may best be averaged, since the combined links would most likely not have the sum of the individual delays, etc. Other combination means for these or other types of link data may be used as appropriate, and such means are within the scope of the present invention, and those mentioned here are merely representative examples.

Once the link data is combined for the virtual combined link(s), route optimization techniques may then be applied (e.g., by a route optimization process) to one or more virtual combined links based on the combined link data, in addition to link data for zero or more conventional single links (physical or virtual). In other words, route optimization techniques conventionally operate on individual links, as understood by those skilled in the art. In accordance with the present invention, however, these route optimization techniques may now operate in substantially the same manner, but where at least one of the "individual links" is actually a virtual combined link. Substantially the same route optimization techniques and policies, etc., apply to virtual combined links as they would to conventional single links. In essence, then, the virtual combined links may "appear" to be conventional single links to the route optimization techniques (e.g., illustratively to cost minimization process 369).

Figure 10A:
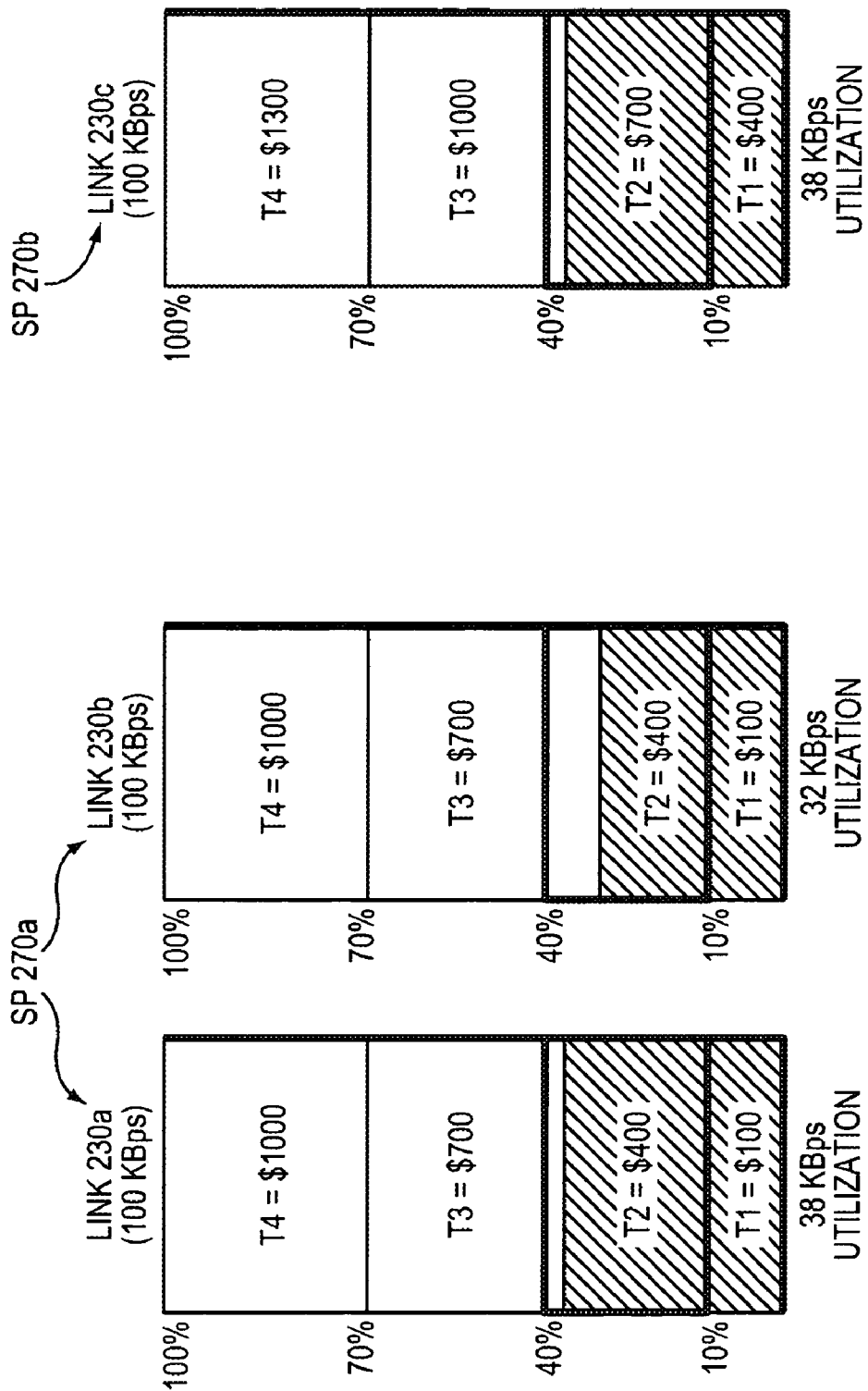
FIGS. 10A-D are graphical representations of link utilization in the computer network of FIG. 2 in accordance with the present invention.

An example of the benefit provided by applying route optimization techniques to combined links may be seen in FIGS. 10A-D. FIG. 10A is a graphical representation of link utilization of links 230a-c in computer network 100 of FIG. 2, without combined links. Customer network 220 couples to SP 270a via link 230a, e.g., having a maximum bandwidth of 100 Kilobytes per second (KBps), and link 230b, e.g., also having a maximum bandwidth of 100 KBps, and further couples to SP 270b via link 230c, e.g., having a maximum bandwidth of 100 KBps. Assume, for example, that SP 270a has an SLA with the customer network defining utilization tiers as follows: for each link 230a and 230b, the first 10% costs $100 (tier "T1"), up to 40% costs $400 (tier "T2"), up to 70% costs $700 (tier "T3"), and the remaining bandwidth up to 100% costs $1000 (tier "T4"). Also assume, for example, that SP 270b has an SLA with the customer network defining utilization tiers for link 230c as follows: using the same percentage boundaries as tiers T1-T4 of SP 270a, for SP 270b T1 costs $400, T2 costs $700, T3 costs $1000, and T4 costs $1300.

Illustratively, assume that a possible traffic distribution, e.g., according to the cost minimization techniques described herein, (or other routing technique as will be understood by those skilled in the art) comprises 38 KBps of bandwidth utilized over link 230a (i.e., 38% utilization), 32 KBps utilized over link 230b (i.e., 32% utilization), and 38 KBps utilized over link 230c (i.e., 38%). Based on the tiered cost structure for the SPs, the total cost of utilizing links 230a-c for 102 KBps is $1500, i.e., $400 for T2 of 230a, plus $400 for T2 of 230b, plus $700 for T2 of 230c.

Figure 10B:
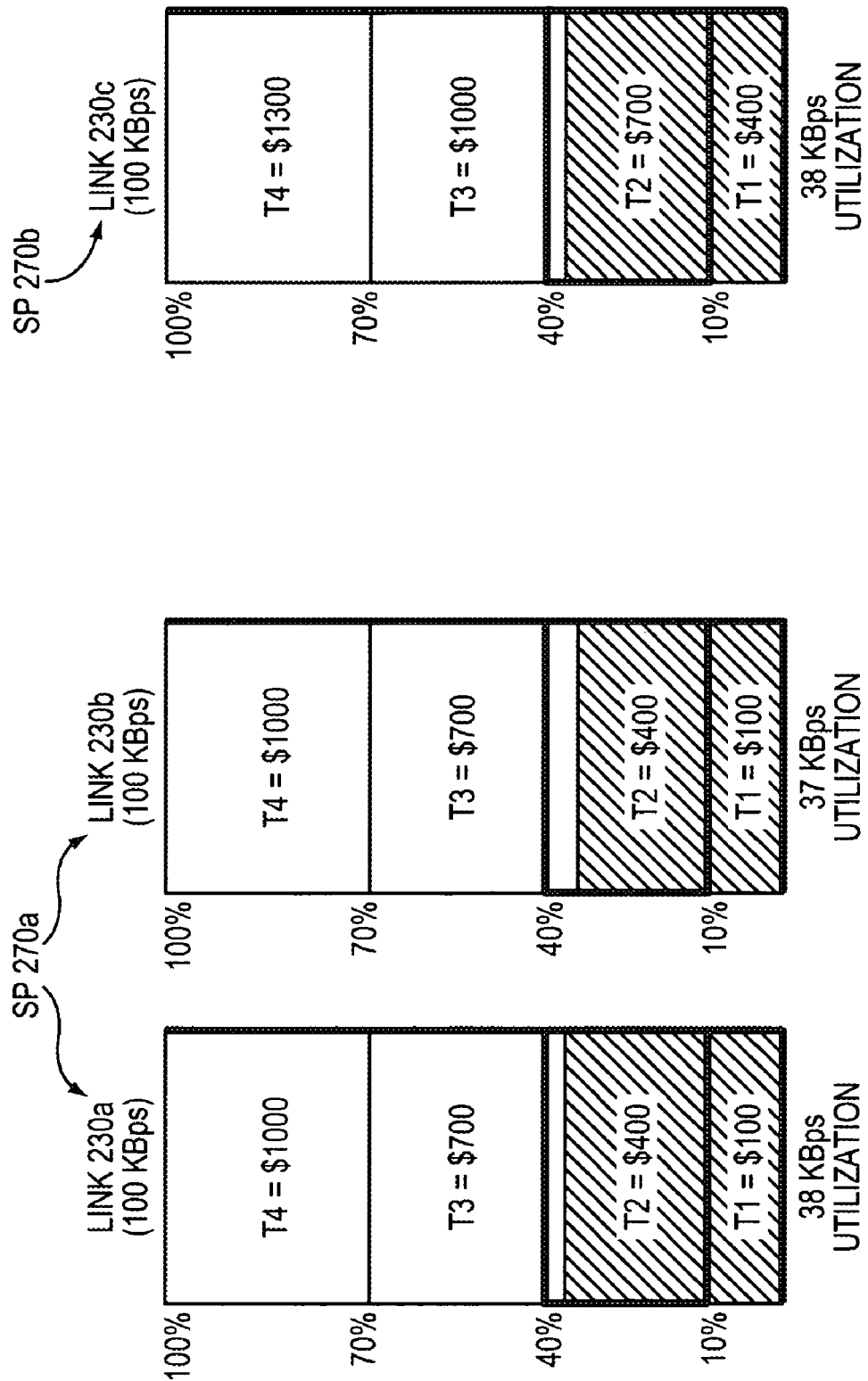

Further assume that route optimization process 369 is attempting to place an additional 5 KBps (e.g., for routes to a particular prefix) over the available links, where the additional 5 KBps is sensitive to delay over the links. Notably, according to cost minimization techniques, cost minimization is a higher priority than routing based on any other metric (e.g., delay). As such, assuming that link 230a has a lower delay value than link 230b (which has a lower delay value than link 230c), based on cost minimization techniques, the additional 5 KBps is placed on link 230b. In other words, link 230a, although having the best delay value, would incur more cost if used, reaching T3 ($700) with the extra 5 KBps (43 KBps, or 43%). (Notably, link 230c would also reach the next, more expensive tier, T3.) The best cost-based option, therefore, remains as link 230b, which would remain in its current tier. The new distribution is shown in FIG. 10B. The 5 KBps, therefore, has been placed on a link with a longer delay than that of another link, regardless of its sensitivity to delay.

It is important to note that the above situation with reference to FIGS. 10A and 10B may result in either the case where the links are not combined, or in the case where the SLA combines the links, but the route optimization process 269 is unable to accommodate (i.e., optimize routes based on) the combined links.

Figure 10C:
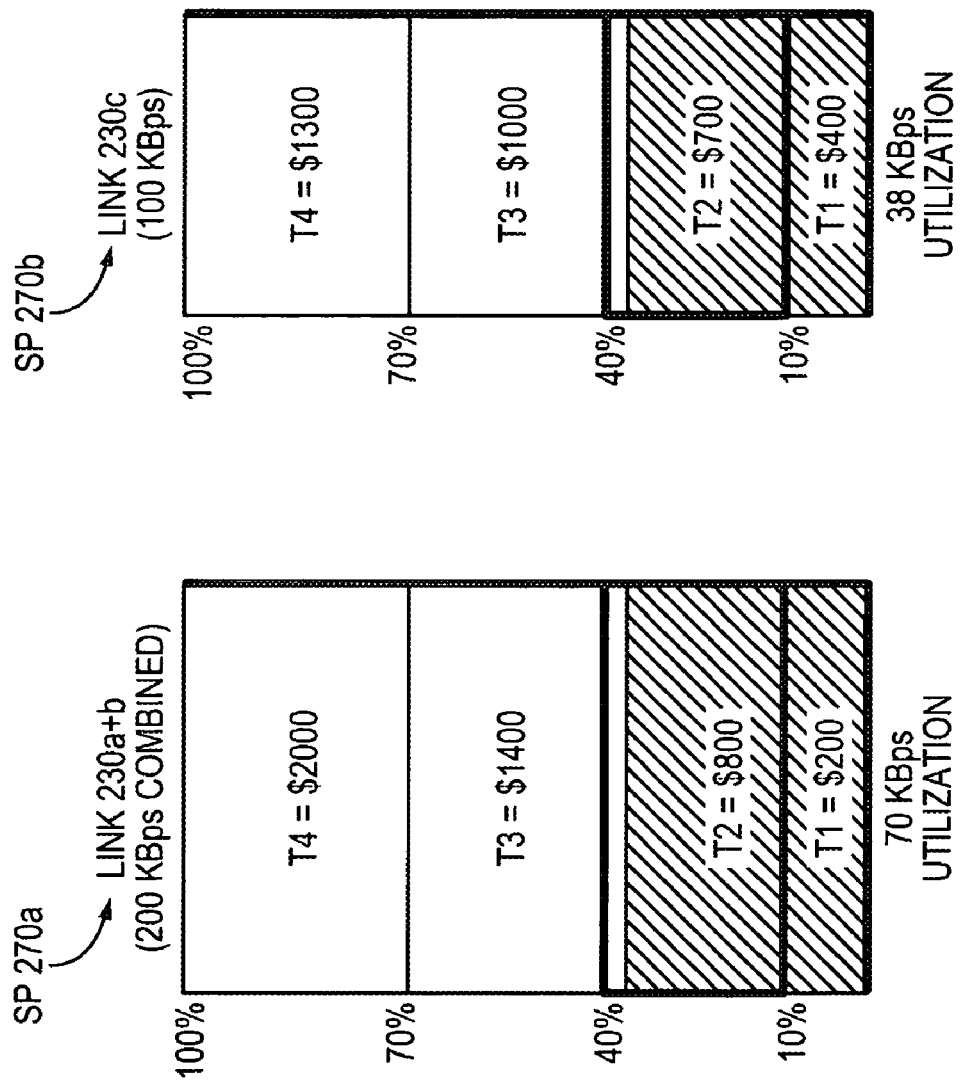

In accordance with the present invention, then, assume that SP 270a has an SLA with the customer network that aggregates the two links 230a and 230b, and applies the same tiered structure as above (i.e., up to 10%, 40%, 70%, and 100%), except now the corresponding costs for the combined links may be doubled (i.e., $200, $800, $1400, and $2000). That is, SP 270a combines the total bandwidth utilization of both links (e.g., 200 KBps), and applies the tiered structure (e.g., with higher costs) to the total of the two links. Those skilled in the art will understand that the same tiered structure need not be applied, and that different utilization percentages/amounts and/or costs may be used. Also, while the example uses equal-bandwidth links, those skilled in the art will understand that unequal-bandwidth links may also be combined. FIG. 10C graphically represents the new tiered cost structure with aggregated links 230a and 230b for the traffic distribution as in FIG. 10A, where 70 KBps (total) bandwidth is utilized over links 230a-b (i.e., 35% total utilization), and 38 KBps of bandwidth is utilized over link 230c (i.e., 38% utilization). Notably, because the link costs remain proportional, the total cost of the traffic remains the same ($1500). (Moreover, as those skilled in the art will understand, it may be necessary to synchronize the roll-up times and billing periods for the combined links.)

In order to maximize the optimization based on the SLA with aggregated links, the cost of the links, and the delay (or other metric), the present invention provides the route optimization technique with a means to merge the link data of the corresponding links (e.g., total bandwidth, utilization, total available bandwidth, etc.) into link data for a single virtual combined link. In this way, the route optimization technique (e.g., cost minimization) may be performed on two links (virtual combined link 230a-b and link 230c) instead of three as before.

Figure 10D:
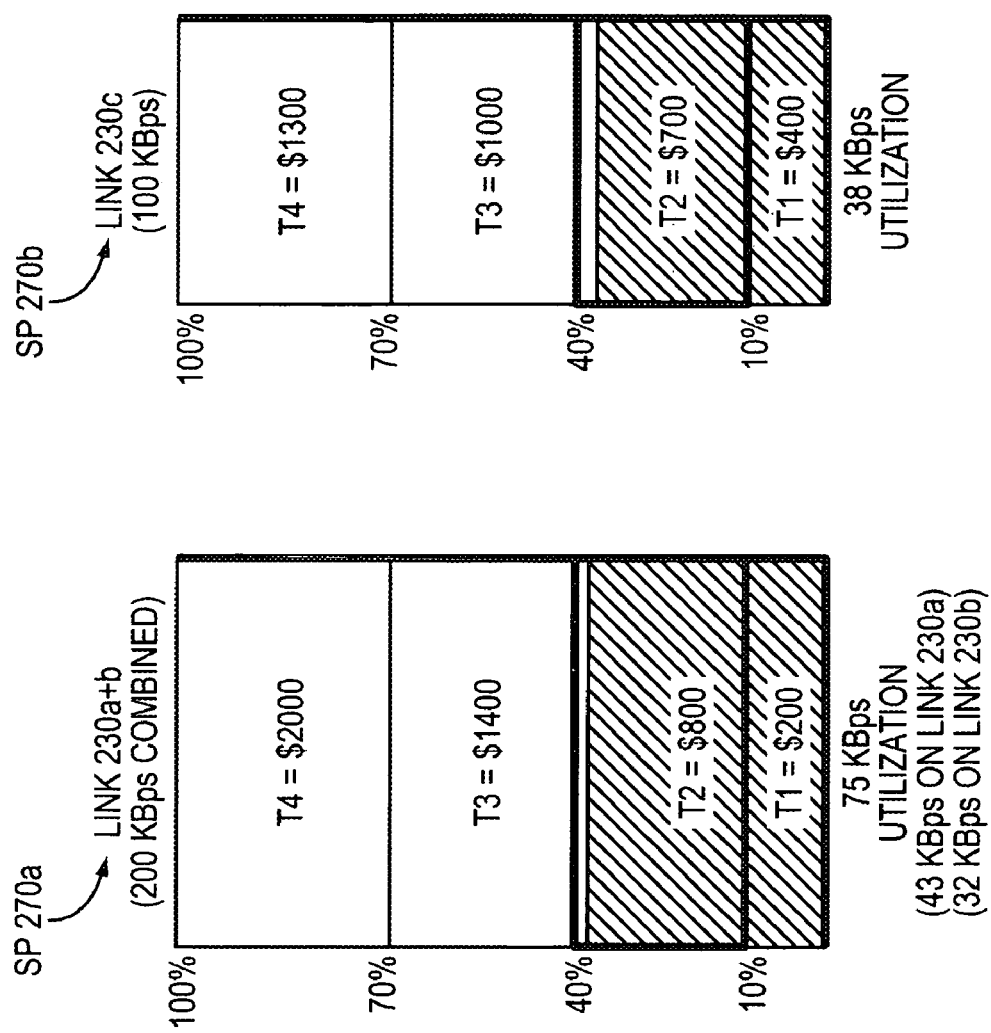

FIG. 10D demonstrates the advantage afforded by combining the link data and performing route optimization (i.e., cost minimization and delay minimization) on the virtual combined link, rather than individual links. Here, the cost minimization process 369 may optimize routing in accordance with the present invention to route the additional 5 KBps over the combined links 230a+b, however, now the delay-sensitive traffic may be routed over the lower delay link, link 230a. In other words, because links 230a and 230b are combined, any division of total traffic (up to a maximum link utilization) may utilize either of the two combined links according to which link best suits particular traffic. For instance, once the traffic is routed to the virtual combined link based on a first priority (e.g., cost minimization), the traffic may then be routed over either of the two individual links based on lower priorities (e.g., delay). As such, the delay-sensitive 5 KBps additional traffic may be physically routed over link 230a in accordance with the present invention, and the total cost (based on the combined link SLA) remains the same.

Notably, those skilled in the art will understand that the combined links of the present invention may be used with route optimization techniques other than the cost minimization technique described herein, and that the cost minimization technique is merely a representative example of the advantages of the present invention. For example, various load balancing techniques, link group route optimization techniques as described in above-reference patent application Ser. No. 11/336,734, and other techniques may be used in accordance with the combined links of the present invention. Moreover, once a virtual combined link is selected based on route optimization techniques, other techniques known to those skilled in the art, such as load balancing, load sharing, hashing functions, random dividing, policy-based routing (e.g., delay), etc., may be used to determine over which of the individual links within the virtual combined link to transmit the traffic. Also, those skilled in the art will appreciate that the present invention may be advantageously used with SLAs that combine links as a general matter, whether or not the combined links offer any optimization advantage. Since the SLA is only directed to the combined links, it may be desirable to manage routes accordingly.

Figure 11:
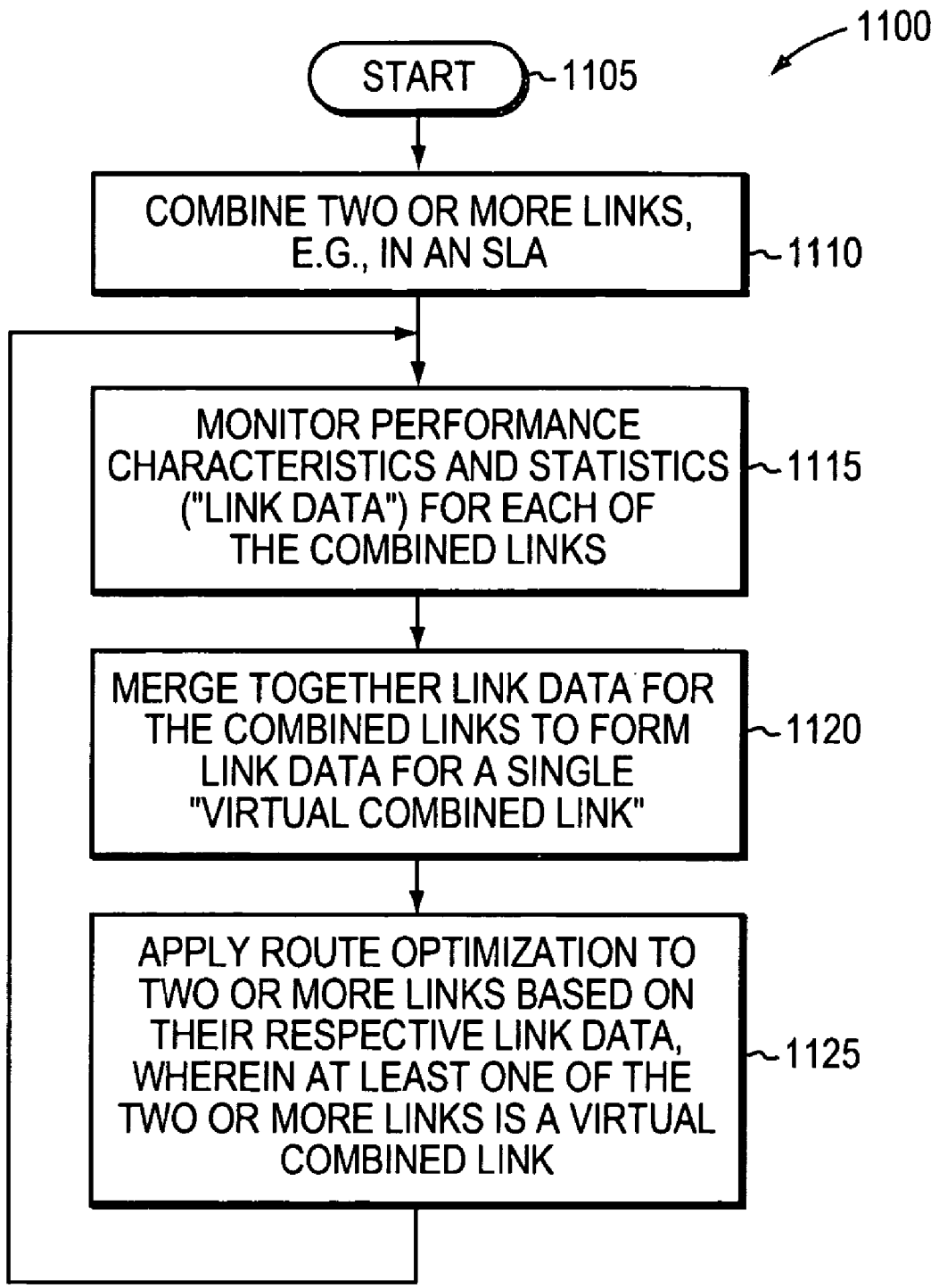
FIG. 11 is a flowchart illustrating a procedure for managing route optimization for combined links in a computer network in accordance with the present invention.

FIG. 11 is a flowchart illustrating a procedure for managing route optimization for combined links in a computer network in accordance with the present invention. The procedure 1100 starts at step 1105, and continues to step 1110, where two or more links are combined, e.g., for purposes of an SLA or for other purposes, as described above. At step 1115, performance characteristics and statistics ("link data") is monitored for each of one or more links that have been combined (i.e., the "combined links"). For example, data collector 368 may collect information regarding the utilization of each of the combined links, as described above. At step 1120, the monitored link data for the combined links is merged together to form link data for a single "virtual combined link." Once the link data is created for the virtual combined link, route optimization techniques (e.g., conventional techniques, or the illustrative technique described herein) may be applied to two or more links based on their respective link data in step 1125. Notably, at least one of the two or more links is a virtual combined link in accordance with the present invention, and the route optimization technique operates on the virtual combined link as though it were a conventional single link (physical or virtual). The procedure may either end, or return to step 1115 to monitor, merge, and apply route optimization accordingly.

Advantageously, the present invention performs route optimization of services provided by one or more SPs for combined links in a computer network. By combining the link data for two or more links, and managing route optimization based on the combined link data, the present invention enhances the control of routes and flow of traffic, e.g., in such a way so as to more closely reflect SLA policies having combined links. The present invention also illustratively incorporates an efficient and accurate route optimization technique for minimizing cost associated with services provided by a plurality of SPs by being cognizant of the SPs' cost structures, actively monitoring utilization of the SPs' services, and distributing utilization among the SPs as necessary in a manner that minimizes the cost of the services provided by the SPs. Moreover, the illustrative route optimization technique does not require that the billing periods between SPs be synchronized, as the target tier for each SP is determined independently.

The above-described illustrated embodiment of the invention describes the data collector and route optimization (e.g., cost minimization) aspects of the invention as performed in a single intermediate node; however, this is not intended to be a limitation of the invention. Rather in other embodiments, these and other aspects of the invention are distributed among a plurality of nodes.

Figure 12:
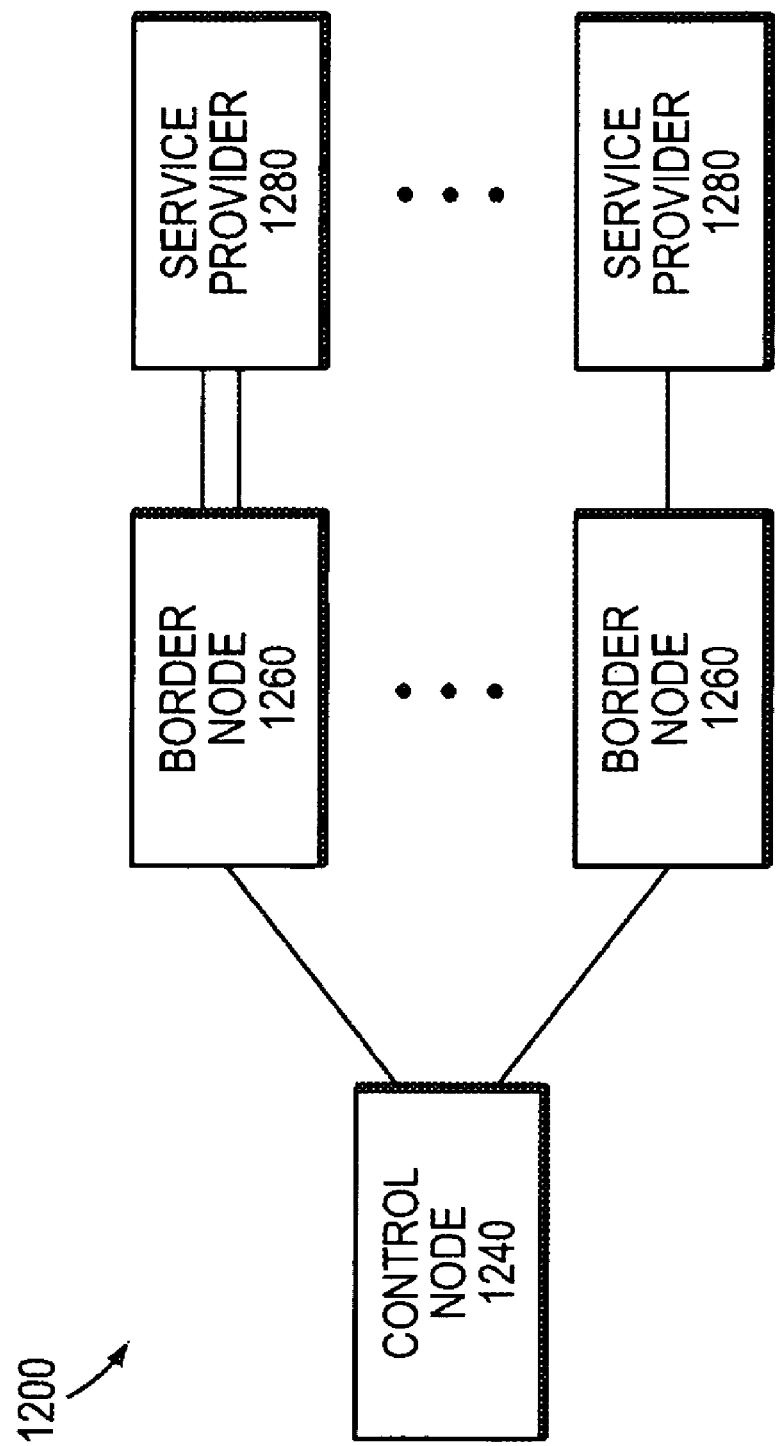
FIG. 12 is a schematic block diagram of a computer network wherein aspects of the inventive technique are distributed among a plurality of network nodes.

For example, FIG. 12 is a schematic block diagram of a computer network 1200 wherein aspects of the inventive technique are distributed among a plurality of network nodes. The network 1200 comprises a control node 1240 coupled to a plurality of border nodes 1260 which, in turn, are coupled to a plurality of SPs 1280. The border nodes 1260 are network nodes, such as border routers, that are configured to, inter alia, perform various functions in accordance with the inventive technique that are associated with e.g., the data collector process 368 described above. These functions may include collecting information similar to the information collected by the data collector process 368, in a manner as described above. The control node 1240 is a node, such as a computer system or intermediate node, coupled to the border nodes 1260. Control node 1240 is configured to perform, inter alia, various functions in accordance with the inventive technique that are associated with, e.g., the route optimization process 369 described above. These functions may include gathering information collected by the border nodes 1260, processing the information and reconfiguring the border nodes 1260 in a manner that minimizes costs, as described above. For example, the control node 1240 may be configured as, e.g., an OER Master Controller, and border nodes 1260 may be OER border routers, such as described in above-referenced patent application Ser. No. 11/336,734.

It should be further noted, that in the above-described embodiment of the invention, only one SP 270 is coupled on a link or links 230 to the customer network 220; however, this too is not intended to be a limitation of the invention. An intermediate node that is coupled to more than one SP via a link or links may take advantage of the inventive technique provided measurement data is acquired and processed for each SP in a manner as described above.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all

What is claimed is:

1. A method for minimizing costs associated with services provided by a plurality of service providers (SPs) over combined links, wherein each SP charges for utilization of its service based on a tiered pricing structure comprising one or more tiers and wherein each tier correlates to an amount of data transferred by the SP and a cost, the method comprising:
    forming one or more virtual combined links that each encompass two or more combined links coupled to one of the plurality of SPs, each virtual combined link to appear as a single link;
    merging, by a processor of a router, link data for the two or more combined links of each virtual combined link to form link data for the virtual combined link;
    applying a route optimization technique to one or more virtual combined links based on the combined link data, in addition to link data for one or more single links coupled to one of the plurality of SPs,
    wherein the route optimization technique comprises
        i) generating a target tier for each virtual combined link of each SP based on link utilization data for the virtual combined links wherein the target tier represents a tier contained in the SP's tiered pricing structure that correlates an amount of data transferred by the SP to a monetary cost,
        ii) generating a momentary target utilization rate (MTUR) for each virtual combined link of each SP based on the generated target tier for each virtual combined link of each SP and utilization of the virtual combined links wherein the MTUR represents a cumulative utilization of a virtual combined link at a particular instance of time, and
        iii) distributing utilization of the virtual combined links among each of the virtual combined link of each SP based on the MTUR of each virtual combined link and based on the tiered pricing structure of each SP in a manner that minimizes the monetary cost of the services provided by the SPs; and
    applying a further route optimization technique to the two or more combined links encompassed by each virtual combined link to distribute data traffic of the virtual combined links among the combined links in a manner that minimizes a metric value other than monetary cost.

2. A method for performing route optimization of services provided by one or more service providers (SPs) using combined links in a computer network, wherein each SP charges for utilization of the SP's services, the method comprising:
    combining two or more combined links coupled to one of the one or more SPs to form a single virtual combined link that encompasses the two or more combined links, the virtual combined link to appear as a single link;
    merging, by a processor of a router, link data for the two or more combined links to form link data for the virtual combined link;
    applying a route optimization technique to the virtual combined link and at least one other link coupled to one of the one or more SPs, the route optimization technique to distribute data traffic among the virtual combined link and the at least one other link in a manner that minimizes monetary costs based on the link data for the virtual combined link, in addition to link data for the at least one other link; and
    applying a further route optimization technique to the two or more combined links encompassed by the virtual combined link to distribute data traffic of the virtual combined link among the two or more combined links in a manner that minimizes a metric value other than monetary cost based on the link data for the two or more combined links.

3. The method as in claim 2, further comprising:
    monitoring the link data for the two or more combined links.

4. The method as in claim 2, wherein the link data is selected from a group comprising: bandwidth, utilization, bandwidth, cost, delay, packet loss, mean opinion score (MOS), and round trip time (RTT).

5. The method as in claim 2, further comprising:
    transmitting data traffic to one or more service providers (SPs) over the combined links within the virtual combined link-according to the further route optimization technique.

6. The method as in claim 2, wherein the combined links are combined in accordance with one or more service level agreements (SLAs) with the one or more service providers (SPs).

7. The method as in claim 6, wherein the at least one of the one or more SLAs define a tiered cost structure.

8. The method as in claim 7, wherein the route optimization technique minimizes monetary costs according to the tiered cost structure.

9. The method as in claim 1 wherein the metric value other than monetary cost is a lower priority metric value than monetary cost.

10. The method as in claim 9, wherein the metric value other than monetary cost is a delay.

11. An apparatus for performing route optimization of services provided by one or more service providers (SPs) for combined links in a computer network, wherein each SP charges for utilization of the SP's services, the apparatus comprising:
    processor means for combining two or more combined links coupled to one of the one or more SPs to form a single virtual combined link that encompasses the two or more combined links, the virtual combined link to appear as a single link;
    processor means for merging link data for two or more combined links to form link data for the virtual combined link;
    processor means for applying a route optimization technique to the virtual combined link and at least one other link coupled to one of the one or more SPs, the route optimization technique to distribute data traffic among the virtual combined link and the at least one other link in a manner that minimizes monetary costs based on the link data for the virtual combined link, in addition to link data for the at least one other link; and
    processor means for applying a further route optimization technique to the two or more combined links encompassed by the virtual combined link to distribute data traffic of the virtual combined link among the two or more combined links in a manner that minimizes a metric value other than monetary cost based on the link data for the two or more combined links.

12. A non-transitory computer readable medium containing executable program instructions for performing route optimization of services provided by one or more service providers (SPs) for combined links in a computer network, wherein each SP charges for utilization of the SPs services, the executable program instructions comprising program instructions for:
    combining two or more combined links coupled to one of the one or more SPs to form a single virtual combined link that encompasses the two or more combined links, the virtual combined link to appear as a single link;

merging link data for two or more combined links to form link data for the virtual combined link;

applying a route optimization technique to the virtual combined link and at least one other link coupled to one of the one or more SPs, the route optimization technique to distribute data traffic among the virtual combined link and the at least one other link in a manner that minimizes monetary costs based on the link data for the virtual combined link, in addition to link data for the at least one other link; and applying a further route optimization technique to the two or more combined links encompassed by the virtual combined link to distribute data traffic of the virtual combined link among the two or more combined links in a manner that minimizes a metric value other than monetary cost based on the link data for the two or more combined links.

13. A node for performing route optimization of services provided by one or more service providers (SPs) for combined links in a computer network, wherein each SP charges for utilization of the SP's services, the node comprising:

one or more network interfaces;

a processor coupled to the one or more network interfaces and adapted to execute software processes; and a memory adapted to store a data collection process executable by the processor, the data collection process configured to: i) monitor link data for two or more combined links coupled to one of the one or more SPs, and ii) merge the link data from the two or more combined links to form link data for a single virtual combined link that encompasses the two or more combined links, the virtual combined link to appear as a single link to a route optimization process executable by the processor; and the memory further adapted to store the route optimization process executable by the processor, the route optimization process configured to: apply a route optimization technique to the virtual combined link and at least one other link coupled to one of the one or more SPs, the route optimization technique to distribute data traffic among the virtual combined link and the at least one other link in a manner that minimizes monetary costs based on the link data for the virtual combined link, in addition to link data for the at least one other link, and to distribute data traffic among the two or more combined links encompassed by the virtual combined link in a manner that minimizes a metric value other than monetary cost based on the link data for the two or more combined links.

14. The node as in claim 13, further comprising: an optimized edge routing (OER) process as the data collection process.

15. The node as in claim 13, further comprising: an optimized edge routing (OER) process as the route optimization process.

16. The node as in claim 13, further comprising: an optimized edge routing (OER) process as the data collection process and route optimization process.

17. The node as in claim 13 wherein the metric value other than monetary cost is a lower priority metric value than monetary cost.

18. The node as in claim 13, wherein the link data is selected from a group comprising: bandwidth, utilization, bandwidth, cost, delay, packet loss, mean opinion score (MOS), and round trip time (RTT).

* * * * *

UNITED STATES PATENT AND TRADEMARK OFFICE
CERTIFICATE OF CORRECTION

PATENT NO. : 8,165,969 B2
APPLICATION NO. : 11/336584
DATED : April 24, 2012
INVENTOR(S) : Pritam Shah et al.

It is certified that error appears in the above-identified patent and that said Letters Patent is hereby corrected as shown below:

Col. 9, line 39 should read as follows: "~~Asseme~~ Assume, for example, SP 270a (FIG. 2) bills for its service"

Col. 19, line 1 should read as follows: "such variations and modifications as come within the ~~is~~ true"

Signed and Sealed this
Third Day of July, 2012

David J. Kappos
*Director of the United States Patent and Trademark Office*